US012662032B2

(12) United States Patent
Baba et al.

(10) Patent No.: US 12,662,032 B2
(45) Date of Patent: Jun. 23, 2026

(54) VEHICLE SEAT

(71) Applicant: TS TECH CO., LTD., Asaka (JP)

(72) Inventors: Hiroshi Baba, Shioya-gun (JP); Ryota Urushihara, Shioya-gun (JP); Takuya Arai, Shioya-gun (JP); Yoichi Tachikawa, Shioya-gun (JP)

(73) Assignee: TS TECH CO., LTD., Saitama (JP)

( * ) Notice: Subject to any disclaimer, the term of this patent is extended or adjusted under 35 U.S.C. 154(b) by 387 days.

(21) Appl. No.: 18/446,081

(22) Filed: Aug. 8, 2023

(65) Prior Publication Data

US 2024/0010110 A1 Jan. 11, 2024

Related U.S. Application Data

(63) Continuation of application No. PCT/JP2022/001717, filed on Jan. 19, 2022.

(30) Foreign Application Priority Data

Feb. 10, 2021 (JP) ................................. 2021-019643
Mar. 15, 2021 (JP) ................................. 2021-041125
(Continued)

(51) Int. Cl.
*B60N 2/68* (2006.01)
*B60N 2/20* (2006.01)
(Continued)

(52) U.S. Cl.
CPC ............... *B60N 2/682* (2013.01); *B60N 2/20* (2013.01); *B60N 2/42709* (2013.01);
(Continued)

(58) Field of Classification Search
CPC .... B60N 2/01516; B60N 2/2245; B60N 2/68; B60N 2/682; B60N 2/686; B60N 2/42709
See application file for complete search history.

(56) References Cited

U.S. PATENT DOCUMENTS 8,118,342 B2 2/2012 Kokubo et al.
10,060,166 B2 * 8/2018 Sayama .................. E05B 85/20
(Continued)

FOREIGN PATENT DOCUMENTS

JP H02106938 U 8/1990
JP H0465626 U 6/1992
(Continued)

OTHER PUBLICATIONS

International Search Report issued for International Patent Application No. PCT/JP2022/001717, Date of mailing: Mar. 15, 2022, 7 pages including English translation.
(Continued)

*Primary Examiner* — Syed A Islam
(74) *Attorney, Agent, or Firm* — HSML P.C.

(57) ABSTRACT

A vehicle seat includes side frames and plate-shaped brackets. The side frames include cushion side frames disposed to a left and to a right of a seat cushion and back side frames disposed to a left and to a right of a seatback. The plate-shaped brackets are fixed to rear end portions of the cushion side frames to support the back side frames. Each of the brackets includes a first plate shaped part fixed to a corresponding back side frame and a second plate shaped part fixed to a corresponding cushion side frame. The first plate-shaped part is disposed outwardly in the left-right direction relative to a corresponding back side frame, and the second plate-shaped part is disposed inwardly in the left-right direction relative to a corresponding cushion side frame.

19 Claims, 29 Drawing Sheets

(30) Foreign Application Priority Data

| | | | |
|---|---|---|---|
| Mar. 23, 2021 | (JP) | ................................. | 2021-048218 |
| Mar. 25, 2021 | (JP) | ................................. | 2021-052285 |
| Mar. 25, 2021 | (JP) | ................................. | 2021-052286 |
| Mar. 25, 2021 | (JP) | ................................. | 2021-052287 |

(51) Int. Cl.

| | |
|---|---|
| *B60N 2/427* | (2006.01) |
| *B60N 2/015* | (2006.01) |
| *B60N 2/22* | (2006.01) |

(52) U.S. Cl.

CPC .......... *B60N 2/686* (2013.01); *B60N 2/01516* (2013.01); *B60N 2/2245* (2013.01)

(56) References Cited

U.S. PATENT DOCUMENTS

| | | | | |
|---|---|---|---|---|
| 10,118,513 | B2 * | 11/2018 | Fujita | ........................ B60N 2/42 |
| 10,369,907 | B2 | 8/2019 | Baba et al. | |
| 10,384,567 | B2 * | 8/2019 | Yoshida | .................... B60N 2/64 |
| 10,752,138 | B2 * | 8/2020 | Baba | ..................... B60N 2/0031 |
| 2009/0295186 | A1 | 12/2009 | Kokubo et al. | |
| 2015/0091346 | A1 * | 4/2015 | Kitou | ................. B60N 2/42709 |
| | | | | 297/216.14 |
| 2015/0218856 | A1 | 8/2015 | Sayama et al. | |
| 2018/0208087 | A1 | 7/2018 | Baba et al. | |
| 2019/0351793 | A1 | 11/2019 | Baba et al. | |

FOREIGN PATENT DOCUMENTS

| | | | |
|---|---|---|---|
| JP | 2005161987 | A | 6/2005 |
| JP | 2009286253 | A | 12/2009 |
| JP | 2011088553 | A | 5/2011 |
| JP | 2011235789 | A | 11/2011 |
| JP | 2011246067 | A | 12/2011 |
| JP | 2014061781 | A | 4/2014 |
| JP | 2014080833 | A | 5/2014 |
| JP | 2014100987 | A | 6/2014 |
| JP | 2015217406 | A | 12/2015 |
| JP | 2018118583 | A | 8/2018 |
| JP | 2019137403 | A | 8/2019 |
| JP | 2020033019 | A | 3/2020 |
| WO | 2016021554 | A1 | 2/2016 |
| WO | 2017022737 | A1 | 2/2017 |

OTHER PUBLICATIONS

Written Opinion issued for International Patent Application No. PCT/JP2022/001717, Date of mailing: Mar. 15, 2022, 7 pages including English translation.

Notice of Reasons for Refusal issued for Japanese Patent Application No. 2021-052286, Dispatch date: Dec. 10, 2024, 6 pages including English machine translation.

Notice of Reasons for Refusal issued for Japanese Patent Application No. 2021-052287, Dispatch date: Dec. 10, 2024, 6 pages including English machine translation.

Notice of Reasons for Refusal issued for Japanese Patent Application No. 2021-041125, Dispatch date: Dec. 10, 2024, 7 pages including English machine translation.

Notice of Reasons for Refusal issued for Japanese Patent Application No. 2021-052287, Dispatch date: Apr. 22, 2025, 6 pages including English machine translation.

* cited by examiner

UPPER
FRONT ←→ REAR
LOWER

UPPER
REAR ←→ FRONT
LOWER

VEHICLE SEAT

REFERENCE TO RELATED APPLICATIONS

This application is a continuation application of International Application No. PCT/JP2022/001717 filed on Jan. 19, 2022 which claims priority from Japanese Patent Application No. 2021-019643 filed on Feb. 10, 2021, Japanese Patent Application No. 2021-041125 filed on Mar. 15, 2021, Japanese Patent Application No. 2021-048218 filed on Mar. 23, 2021, and Japanese Patent Application Nos. 2021-052285, 2021-052286, and 2021-052287 filed on Mar. 25, 2021. The disclosures of these applications are incorporated herein by reference in their entirety.

TECHNICAL FIELD

The present disclosure relates to a vehicle seat.

BACKGROUND ART

A vehicle seat including a side frame having a flange part is hitherto known state of the art (refer to WO2017/022737). The flange part disclosed in this publication has not been subjected to any reinforcing process such as a quenching process or an embossing process.

DESCRIPTION

It would be desirable to provide a side frame with high rigidity.

In consideration of the background described above, a vehicle seat including an improved side frame is disclosed.

In one aspect, the side frame includes a base wall having a shape of an elongated plate and a first flange part extending from one of longer side edges in a direction non-parallel to the base wall.

The first flange part includes a first processed part that is reinforced by a quenching process or an embossing process.

With this configuration, the first flange part including the first processed part that is reinforced by the quenching process or the embossing process serves to increase the rigidity of the side frame.

Further, a vehicle seat including cushion side frames disposed to the left and to the right of a seat cushion, back side frames disposed to the left and to the right of a seatback, and plate-shaped brackets fixed to rear end portions of the cushion side frames to support the back side frames, is known in the art (refer to WO2017/022737). In the brackets disclosed in this prior-art, a part of each bracket fixed to the corresponding back side frame is disposed outside of the back side frame in a left-right direction. A part of each bracket fixed to the corresponding cushion side frame is also disposed outside of the cushion side frame in the left-right direction.

In this prior-art configuration, since the parts of the brackets fixed to the cushion side frames are disposed outside of the cushion side frames in the left-right direction, the vehicle seat would disadvantageously increase in its size in a left-right direction.

Therefore, restraining the increase in size of the vehicle seat in the left-right direction is desired.

In consideration of the background described above, a vehicle seat including cushion side frames disposed to a left and to a right of a seat cushion, back side frames disposed to a left and to a right of a seatback, and plate-shaped brackets fixed to rear end portions of the cushion side frames to support the back side frames, are disclosed.

In one aspect, each of the brackets includes a first plate-shaped part fixed to a corresponding back side frame and a second plate-shaped part fixed to a corresponding cushion side frame.

The first plate-shaped part is disposed outwardly in a left-right direction relative to a corresponding back side frame.

The second plate-shaped part is disposed inwardly in the left-right direction relative to a corresponding cushion side frame.

With this configuration, the second plate-shaped part of the bracket fixed to the cushion side frame is disposed inwardly in the left-right direction relative to the cushion side frame, and therefore the increase in size of the vehicle seat in the left-right direction can be restrained.

The vehicle seat may further include a reclining mechanism that allows the back side frames to be tilted with respect to the cushion side frames, and the first plate-shaped part may be fixed to each of the back side frame via the reclining mechanism.

The first plate-shaped part may be disposed outwardly in the left right direction relative to the corresponding second plate-shaped part.

With this configuration, the cushion side frames can be disposed inwardly in the left-right direction as compared to when the first plate-shaped part and the corresponding second plate-shaped part are disposed at the same position in the left-right direction, and therefore the increase in size of the vehicle seat in the left-right direction can be restrained.

The bracket may include a fragile part connecting to the first plate-shaped part and the second plate-shaped part.

With this configuration, the bracket may start deforming from the fragile part when there is a collision, and therefore the impact can be absorbed by the bracket.

The fragile part may be configured not to protrude outward in the left-right direction from an outer surface of the first plate-shaped part facing outward in the left-right direction.

With this configuration, the increase in size of the vehicle seat in the left-right direction can be restrained as compared to an alternative configuration in which the fragile part protrudes outward in the left-right direction from an outer surface of the first plate-shaped part facing outward in the left-right direction, for example.

The fragile part may extend from a front end of the bracket to a rear end of the bracket.

With this configuration, the bracket may easily deform when there is a collision as compared to a configuration where the fragile part does not extend to the ends of the bracket.

The second plate-shaped part includes a first fixing part and a second fixing part to be fixed to the corresponding cushion side frame, and the fragile part may extend from the first fixing part to the second fixing part.

With this configuration, the impact made on the back side frame when there is a collision is absorbed by the fragile part before being transmitted to the first fixing part and the second fixing part, and therefore the damage to the first fixing part and the second fixing part can be reduced.

The fragile part may extend from a top end of the cushion side frame to a rear end of the cushion side frame.

Further, a vehicle seat including left and right cushion side frames disposed respectively to the left and to the right of the seat cushion, a connecting pipe connecting the left and right cushion side frames, and a link pivotally connected to the cushion side frame is known in the art (refer to JP2020-33019A). In this art, the connecting pipe is a straight shape, and the link bends in an arc shape detouring around the connecting pipe to avoid contact therewith.

However, in this prior-art, the shape of the link bends greatly to avoid contact with the connecting pipe, and therefore the weight of the link would increase and in turn the weight of the vehicle seat would disadvantageously increase.

It would thus be desirable to restrain the weight of the vehicle seat from increasing.

In consideration of the background described above, a vehicle seat including left and right cushion side frames disposed to a left and to a right of a seat cushion, a connecting pipe connecting the left and right cushion side frames, and a link pivotally connected to the left and right cushion side frames is disclosed.

In one aspect, the connecting pipe includes a first part that extends in a left-right direction, and a second part disposed at a position above the first part and fixed to the cushion side frames, and a third part that bends upward from the first part and connects to the second part.

The second part is disposed over the link.

With this configuration, the connecting pipe bends and can avoid contact with the link, and there is no need to greatly bend the link as in the aforementioned prior-art, therefore the weight of the link can be reduced, and in turn the increase in the weight of the vehicle seat can be restrained.

The link may have a straight shape.

With this configuration, the weight of the link can be reduced, and the increase of the weight of the vehicle seat can be further restrained.

The second part may extend in the left-right direction.

With this configuration, the space between the link and the second part in an upward-downward direction can be made to retain a desired size even when the position of the link is shifted from the normal position in the left-right direction due to an installation position error, as compared to when the second part extends obliquely with respect to the left-right direction, for example.

The link may have a rotation axis on which the link is rotatable relative to the cushion side frames which rotation axis is disposed within an area of which an extent in the upward-downward direction is coextensive with that of a joining portion of the connecting pipe joining to a corresponding cushion side frame.

With this configuration, the rotational axis of the link and the joining portion of the connecting pipe is disposed at an approximately same position in the upward-downward direction, and therefore the dimension of the cushion side frame in the upward-downward can be reduced, for example.

Each of the left and right cushion side frames may include a pipe joint part to which the connecting pipe is joined and a link connecting part to which the link is connected, and each of the left and right cushion side frames has a first dimension, in the upward-downward direction, corresponding to a portion in which the pipe joint part is provided and a second dimension, in the upward-downward direction, corresponding to a portion in which the link connecting part is provided, the first dimension being smaller than the second dimension.

With this configuration, the weight of the cushion side frames can be reduced, and the increase in the weight of the vehicle seat can be restrained.

Each of the cushion side frames may be configured such that at least a part of the first part does not overlap the corresponding cushion side frame when seen from a left or right side.

With this configuration the cushion side frames can be made smaller in the upward-downward direction as compared to, for example, a configuration where the cushion side frames are configured such that the whole first part overlaps the cushion side frame when seen from the left or right side.

Further, the prior-art bracket such as described in JP2011-88553A has possibilities of having negative effects on the reclining mechanism, for example, such that the bracket would possibly come off from the reclining mechanism when the fragile part deforms in a collision, etc.

Therefore, it would be desirable to restrain the negative effect of the fragile part of the bracket on the reclining mechanism, when the fragile part plastically deforms in a collision, etc.

In consideration of the background described above, a vehicle seat that includes a seat cushion frame constituting a framework of a seat cushion that supports buttocks and thighs of a person seated, a seatback frame constituting a framework of a seatback as a backrest, a bracket connecting the seat cushion frame and the seatback frame, and a reclining mechanism that allows the seatback frame to be tilted with respect to the seat cushion frame is disclosed. The bracket includes a fragile part that may plastically deform when there is an impact on the bracket, and wherein a part of the reclining mechanism is formed integrally with the bracket.

With this configuration, a part of the reclining mechanism that is conventionally a member (other than the bracket) engageable with the bracket in the aforementioned prior-art is configured as an integral part of the bracket, and thus is less likely to come off from the other portion of reclining mechanism when the fragile part plastically deforms in a collision, etc. Therefore, the negative effect of the fragile part of the bracket plastically deforming in a collision, etc. on the reclining mechanism can be restrained.

Further, a frame structure for a side frame provided in a seat frame to form a side part of the seat frame is disclosed herein. The side frame includes a frame body part and a flange part formed by bending the side frame at an edge of the frame body part, and at least the flange part has been subjected to an embossing process and is thereby provided with a plurality of bulges.

With this configuration of the side frame including the frame body part and the flange part formed by bending the side frame at the edge of the frame body, at least the flange part is subjected to the embossing process and thereby provided with a plurality of bulges, and therefore the rigidity of the flange part can be increased without increasing the thickness of the flange part.

Specifically, because increasing the rigidity of a part far from a center of gravity of the side frame is effective in increasing the rigidity of the side frame, the rigidity of the side frame can be effectively increased by providing the plurality of bulges through the embossing process in the flange part provided at an outer edge of the side frame.

Further, a vehicle latch device for fastening a seat to a car body is known in the art (JP2014-61781A). In this latch device, a ratchet engages with a latch in a lock state where the latch engages with a bar-shaped part, and the lock state is not released even when an external force tends to pull the bar-shaped part away from the latch. The rotation of the latch is also restricted by the flat surface of the ratchet which contacts the curved surface of the latch when a strong external force is exerted on the seat (refer to FIG. 29).

However, in the vehicle latch device described in JP2014-61781A, it is the curved surface of the latch that contacts the flat surface of the ratchet when a strong external force is exerted on the seat. Therefore, the contact area is small, and the large contact pressure would become a problem.

Therefore, it would be desirable to reduce the contact pressure of the latch with the ratchet when an external force that would possibly cause the bar-shaped part to come off is exerted.

Firmly maintaining the lock state is also desired.

In consideration of the background described above, a vehicle latch device that locks or unlocks by engaging with or disengaging from a bar-shaped part is disclosed which vehicle latch device includes a case, a latch, and a ratchet. The latch is pivotally supported by the case and rotatable between a lock state in which the latch engages with the bar-shaped part and an unlock state in which the latch disengages from the bar-shaped part. The ratchet is pivotally supported by the case. The ratchet has an unlock restricting surface that restricts the latch from rotating toward the unlock state when the latch is in the lock state.

In one aspect, the latch has a contact surface that contacts the unlock restricting surface when the latch in the lock state is caused to rotate toward the unlock state by an external force. The contact surface is shaped to fit the unlock restriction surface and allowed to have direct contact with the unlock restricting surface.

With this configuration, in which the contact surface of the latch has a shape fitting the unlock restricting surface to have surface contact with the unlock restricting surface of the ratchet, the contact pressure exerted on the contact surface by the unlock restricting surface when an external force that would possibly cause the bar-shaped part to be pulled away from the latch in the lock state can be reduced.

The unlock restricting surface may have a convex surface, and the contact surface may have a concave surface contoured to fit the convex surface.

With this configuration, when an external force which would possibly cause the bar-shaped part to be pulled away from the latch in the lock state is exerted, the convex surface fits and contacts the concave surface of the contact surface, and the contact of the contact surface and the unlock restricting surface becomes stable, and the lock state can be firmly maintained.

The unlock restricting surface may be shaped to fit an arc of which a center of curvature coincides with a rotational axis of the ratchet.

With this configuration, even if the contact surface hits the unlock restricting surface hard, the contact force does not serve as a force as would cause the ratchet to rotate, and the lock state can be firmly maintained.

The vehicle latch device described above may further include a lever member engaging with the latch and the ratchet and causing the latch and the ratchet to move synchronously, and a pin with which the lever member is pivotally supported by the latch. Here, it would be desirable that a length of contact of the unlock restricting surface with the contact surface as measured when viewed in a direction aligned with the rotation axis of the latch be longer than a diameter of the pin.

It would also be desirable that a length of contact of the unlock restricting surface with the contact surface as measured when viewed in a direction aligned with the rotation axis of the latch be longer than a thickness of the ratchet.

The latch may include a hook-shaped part that is engageable with a bar-shaped part when the latch is in the lock state, and the hook-shaped part has a first support surface closest to the bar-shaped part when the latch is in the lock state and not receiving any external force, and includes a protruding part located at an end portion of the hook-shaped part and protruding from the first support surface. The protruding part includes a second support surface that engages with the bar-shaped part when the latch in the lock state is caused to rotate toward the unlock state by an external force. It would be desirable that the length of contact of the unlock restricting surface with the contact surface as measured when viewed in the direction aligned with the rotation axis of the latch be longer than a length of contact surface of the bar-shaped part contacting the latch when the latch in the lock state is caused to rotate toward the unlock state by an external force.

With those configurations, the contact pressure exerted on the contact surface by the unlock restricting surface can be reduced because the length of the contact length of the unlock restricting surface and the contact surface is longer.

The vehicle seats which can solve the problems described above may include a seat frame and the above-described vehicle latch device fixed to the seat frame.

A method for manufacturing a vehicle latch device that locks or unlocks by engaging with or disengaging from a bar-shaped part, as configured to solve the problems described above, comprises: providing a case; providing a latch pivotally supported by the case and rotatable between a lock state in which the latch engages with bar-shaped part and an unlock state in which the latch disengages from the bar-shaped part; and providing a ratchet pivotally supported by the case and having an unlock restricting surface that restricts the latch from rotating toward the unlock state when the latch is in the lock state, wherein the latch has a contact surface that contacts the unlock restricting surface when the latch in the lock state is caused to rotate toward the unlock state by an external force; and the providing the latch comprises forming the contact surface shaped to fit the unlock restricting surface, and allowed to have surface contact with the unlock restricting surface of the ratchet.

The above aspects, other advantages and further features will become more apparent by describing in detail illustrative, non-limiting embodiments thereof with reference to the accompanying drawings, in which.

Figure 14:
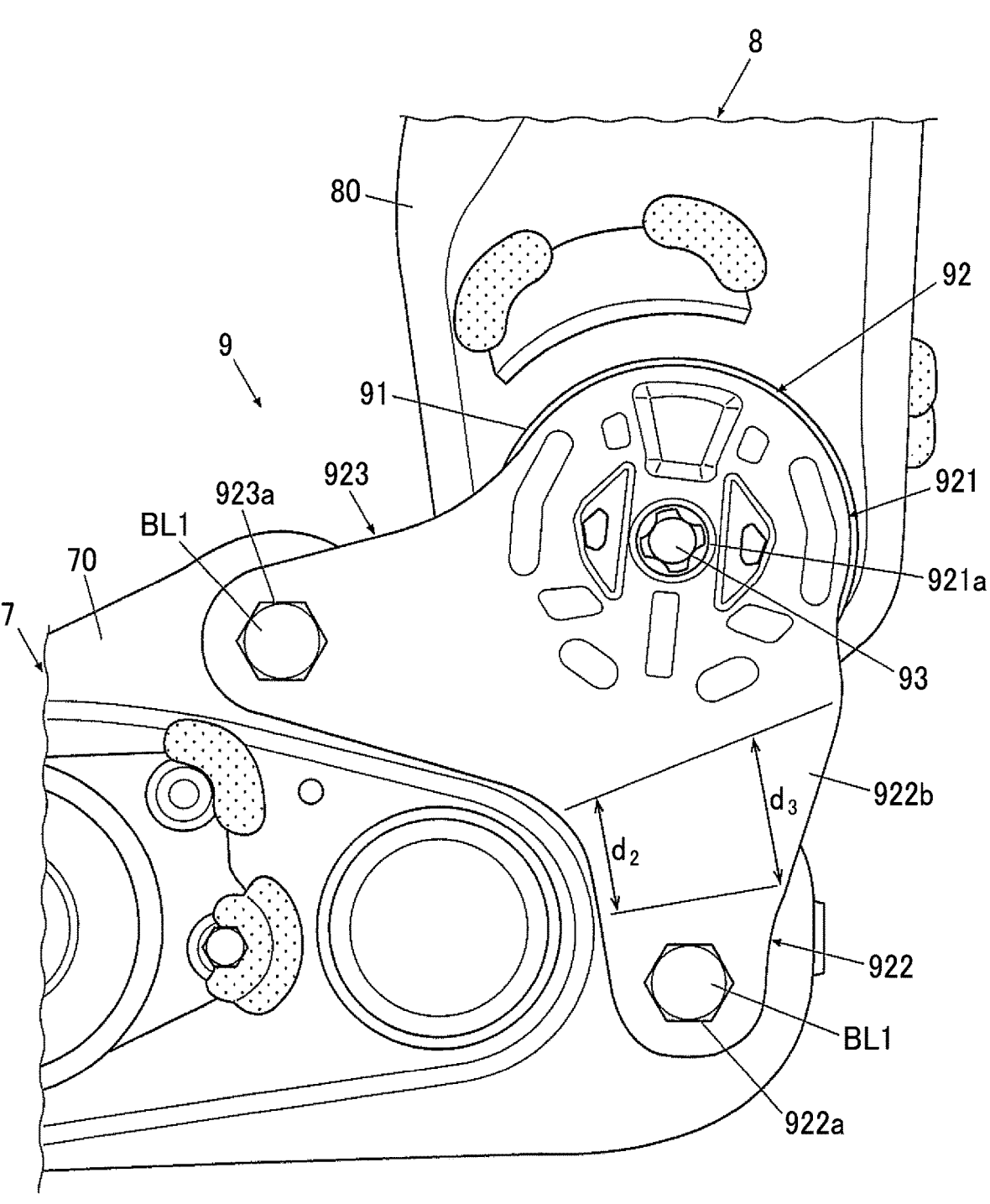

FIG. 14 a partially enlarged side view of the seat frame of the vehicle seat according to the second embodiment with some parts removed for clarity.

Figure 15:
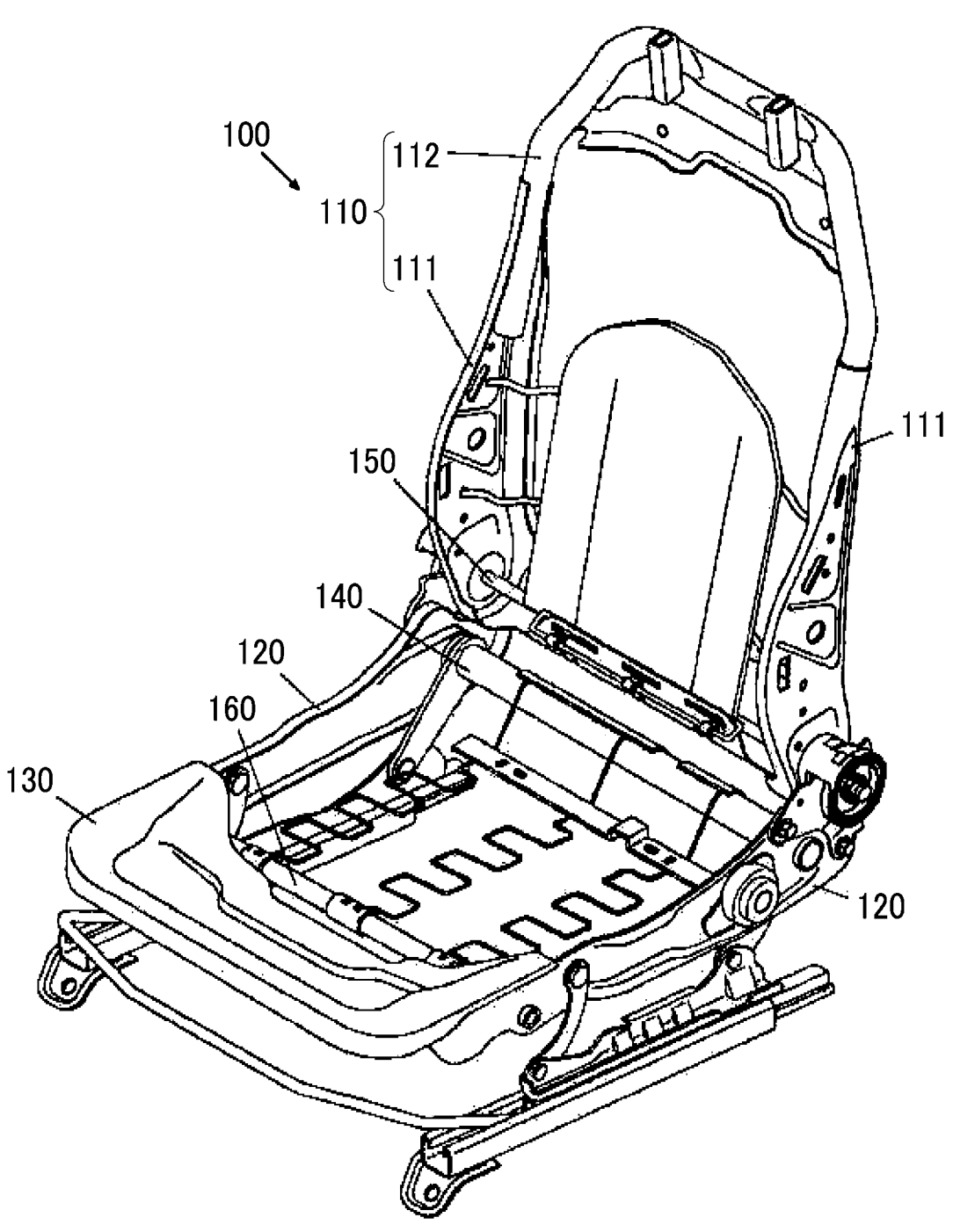

FIG. 15 is a perspective view of an example of a seat frame that comprises a pair of cushion side frames and a pair of back side frames, showing a frame structure of a side frame according to one embodiment.

Figures 16A, 16B:
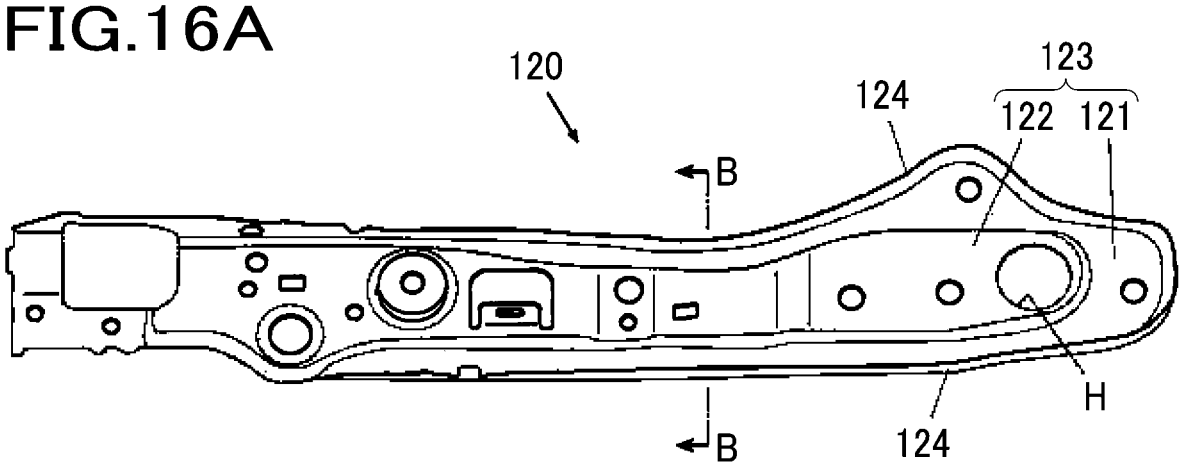

FIG. 16A is a perspective view of the cushion side frame according to the present embodiment for explaining a frame structure of the side frame according to the embodiment shown in FIG. 15.

FIG. 16B is a sectional view of the cushion side frame taken along line B-B of FIG. 16A.

Figure 17:
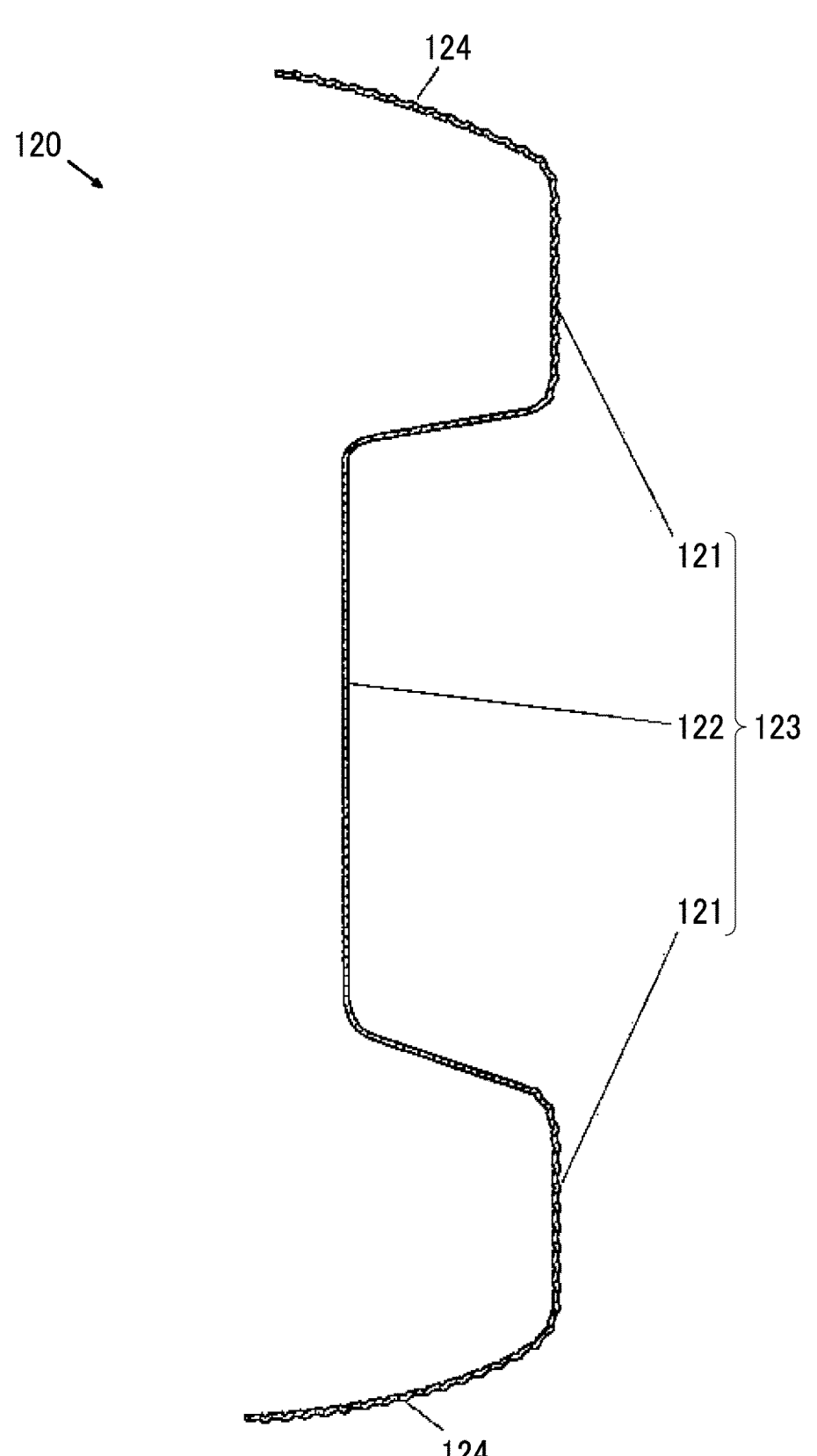

FIG. 17 is an enlarged view of FIG. 16B.

Figure 18:
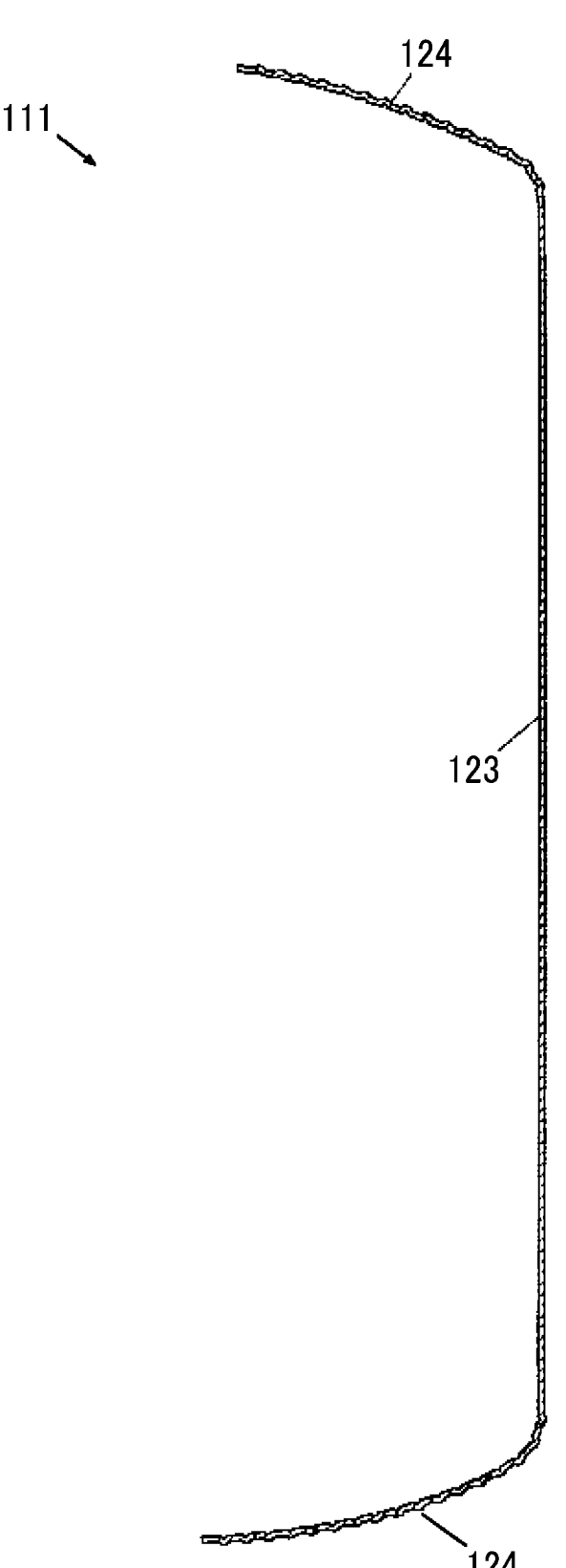

FIG. 18 is a sectional view of a side frame according to an alternative embodiment of the frame structure.

Figure 19:
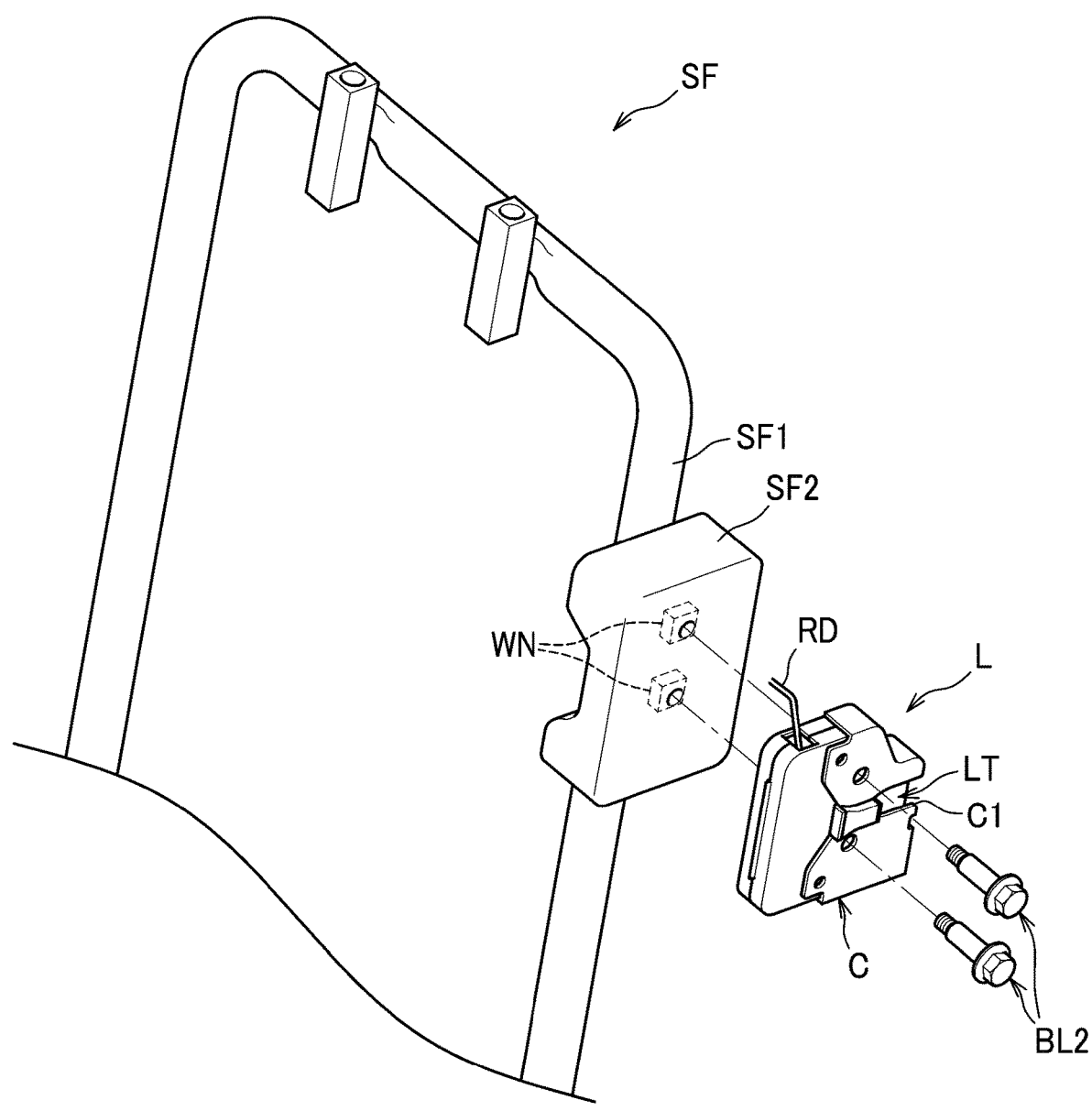

FIG. 19 is a perspective view of a seat frame of a vehicle seat provided with a vehicle latch device according to one example.

Figure 20:
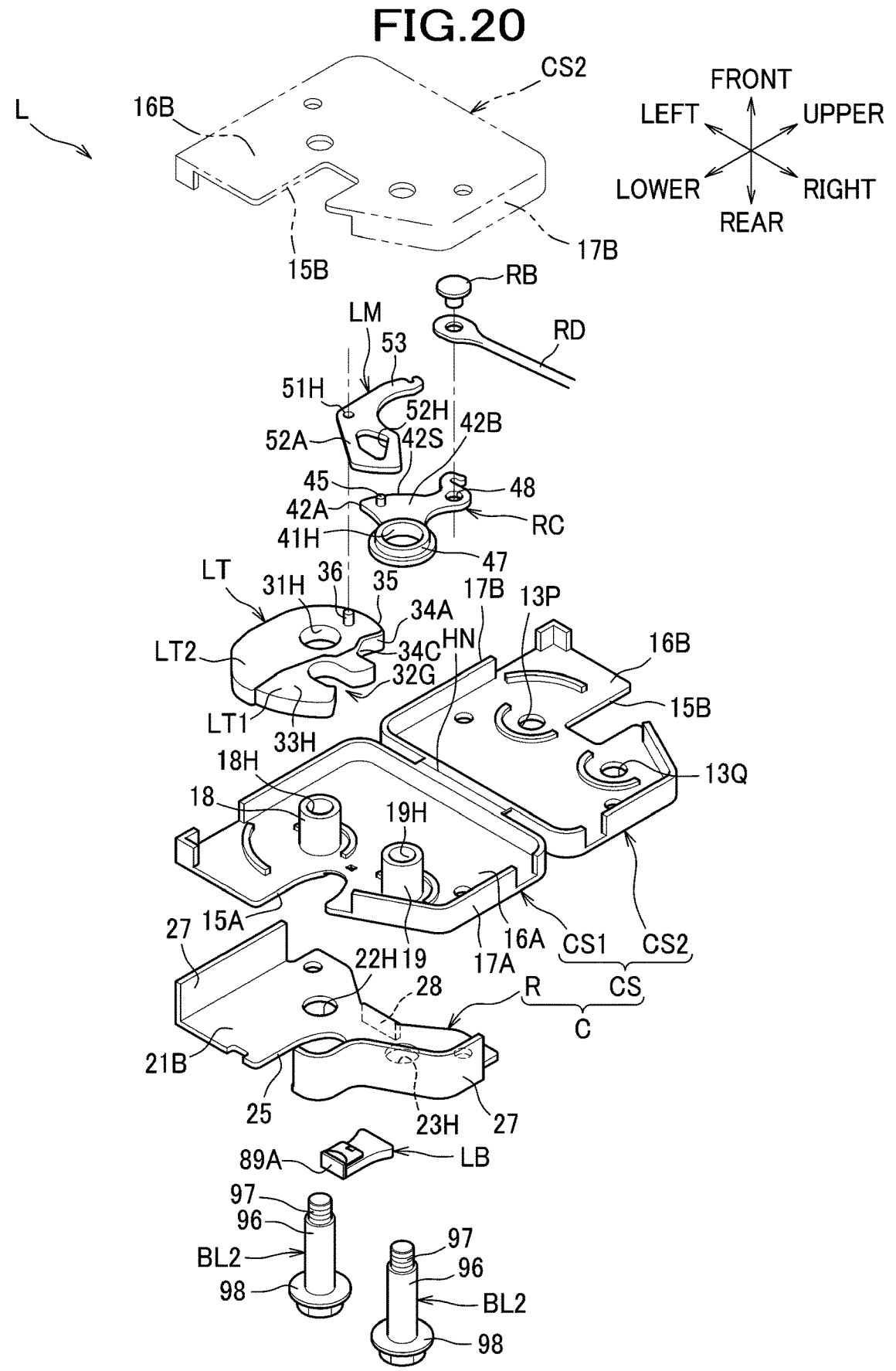

FIG. 20 is an exploded perspective view of the vehicle latch device.

Figure 21:
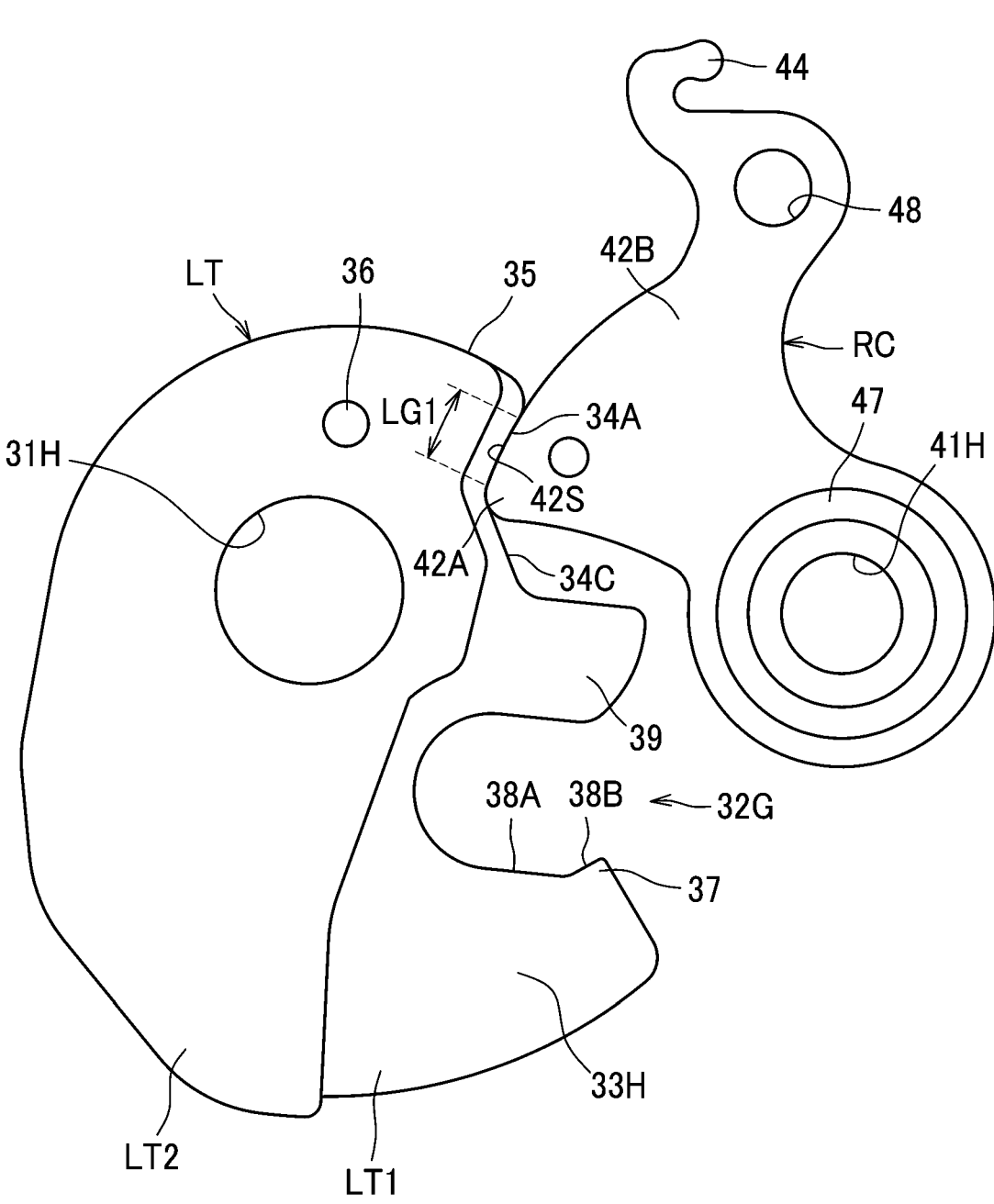

FIG. 21 is an enlarged view of a latch and a ratchet as observed when the contact surface of the latch is in contact with an unlock restricting surface of the ratchet.

Figure 22:
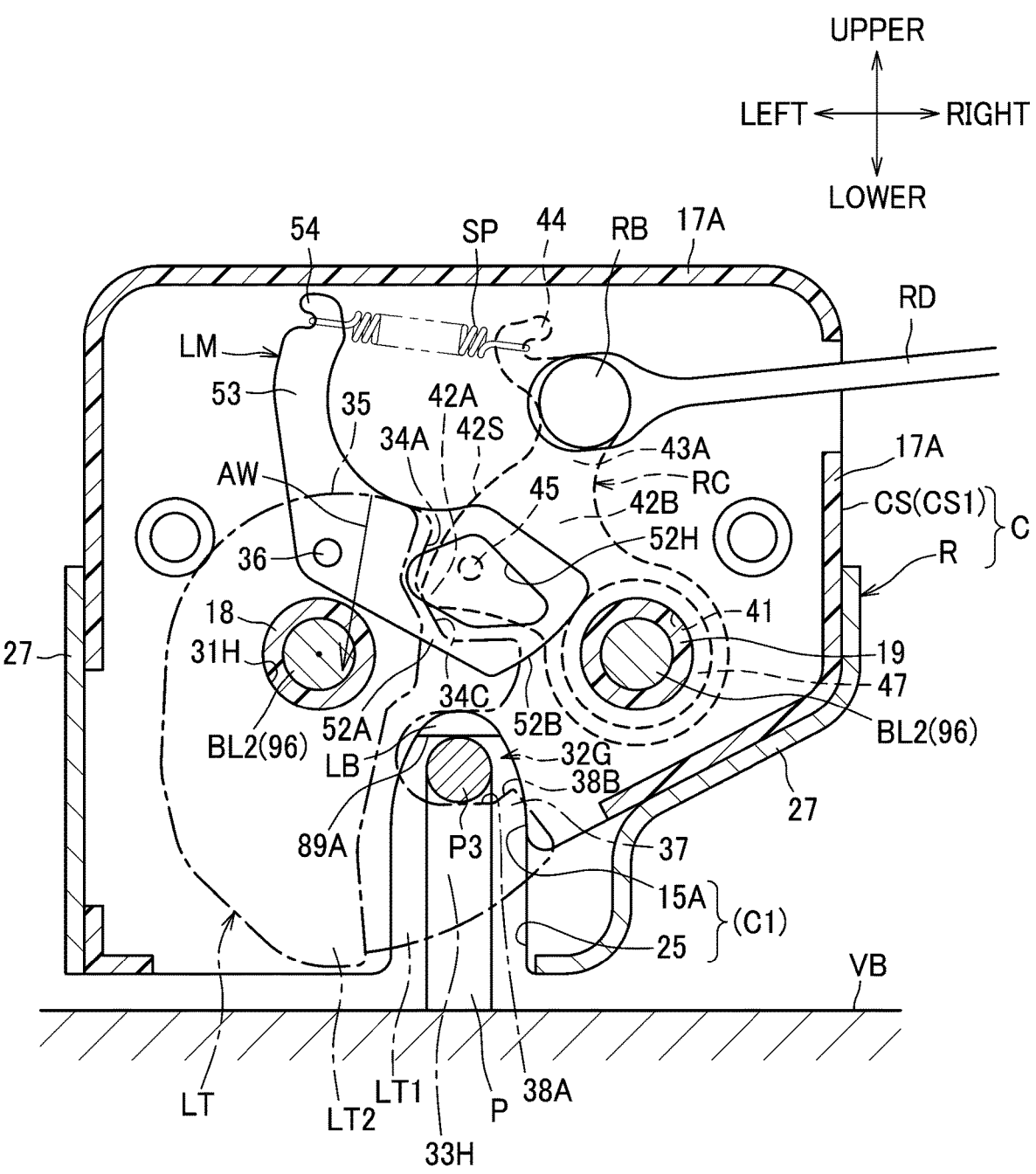

FIG. 22 is a sectional view of the vehicle latch device in a lock state.

Figure 23:
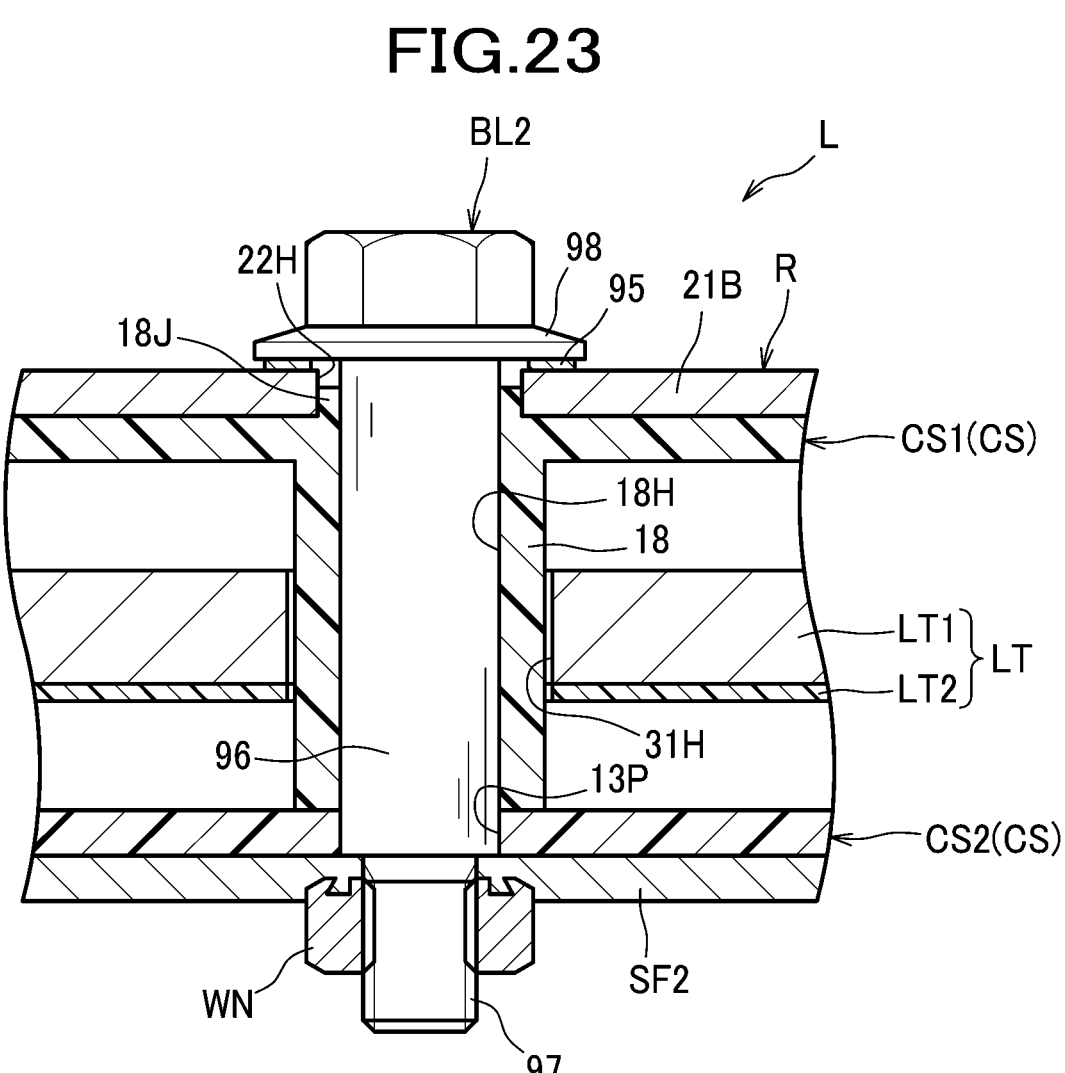

FIG. 23 is a sectional view of a structure by which the latch is pivotally supported.

Figure 24:
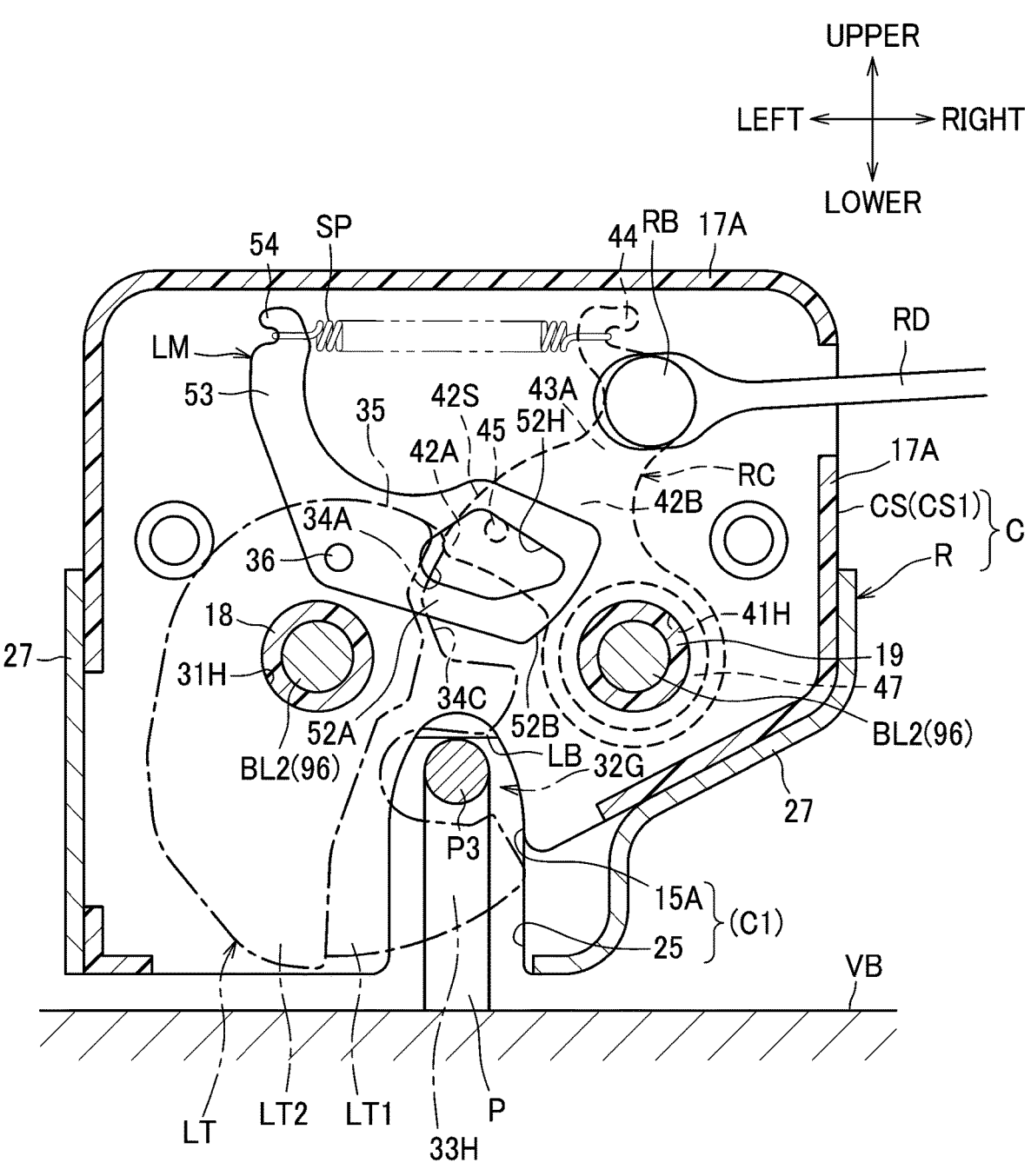

FIG. 24 is a diagram for explaining the movement of the vehicle latch device, showing a state where the rod is pulled to some extent.

Figure 25:
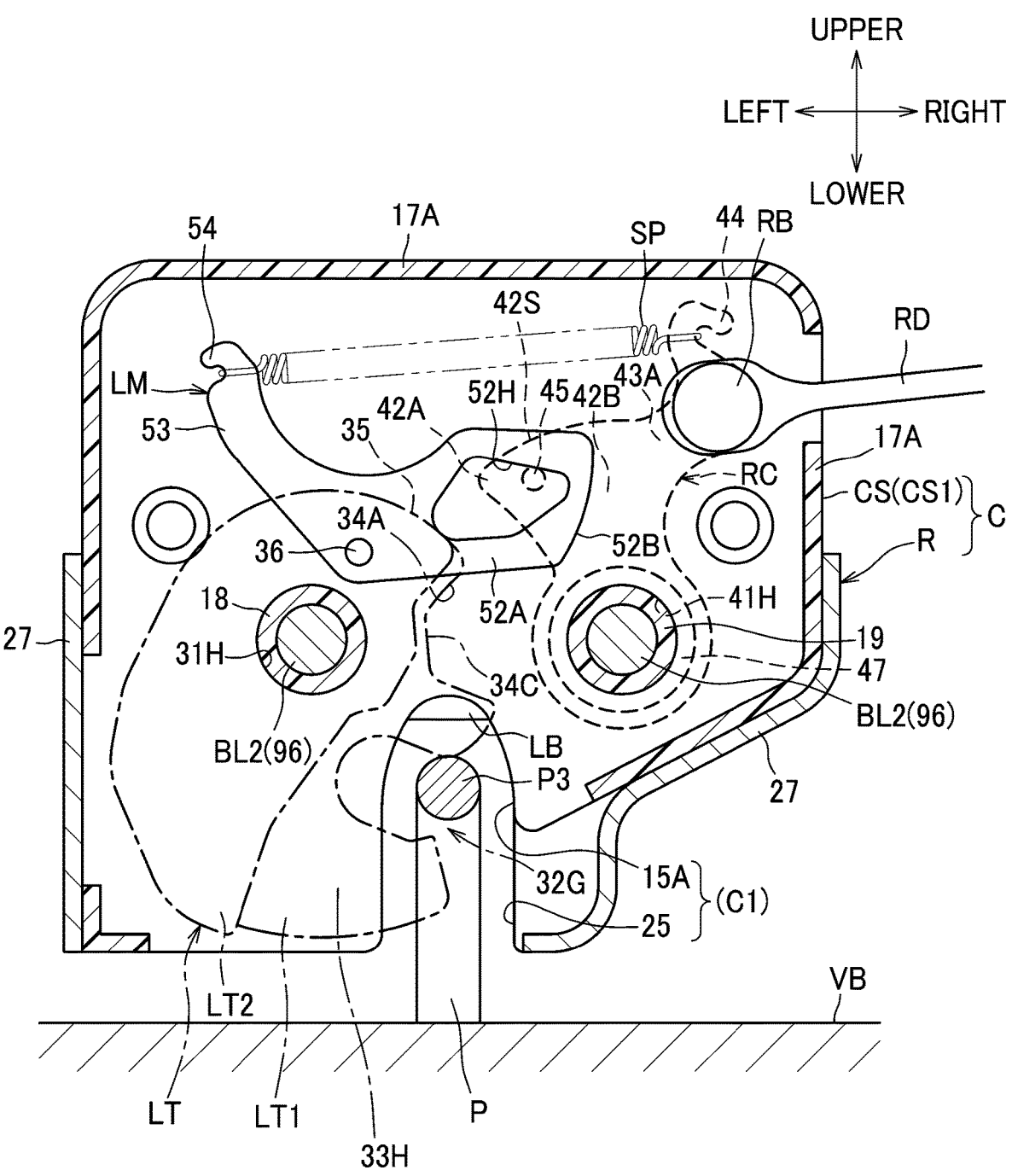

FIG. 25 is a diagram for explaining the movement of the vehicle latch device, showing a state where the rod is pulled to a large extent.

Figure 26:
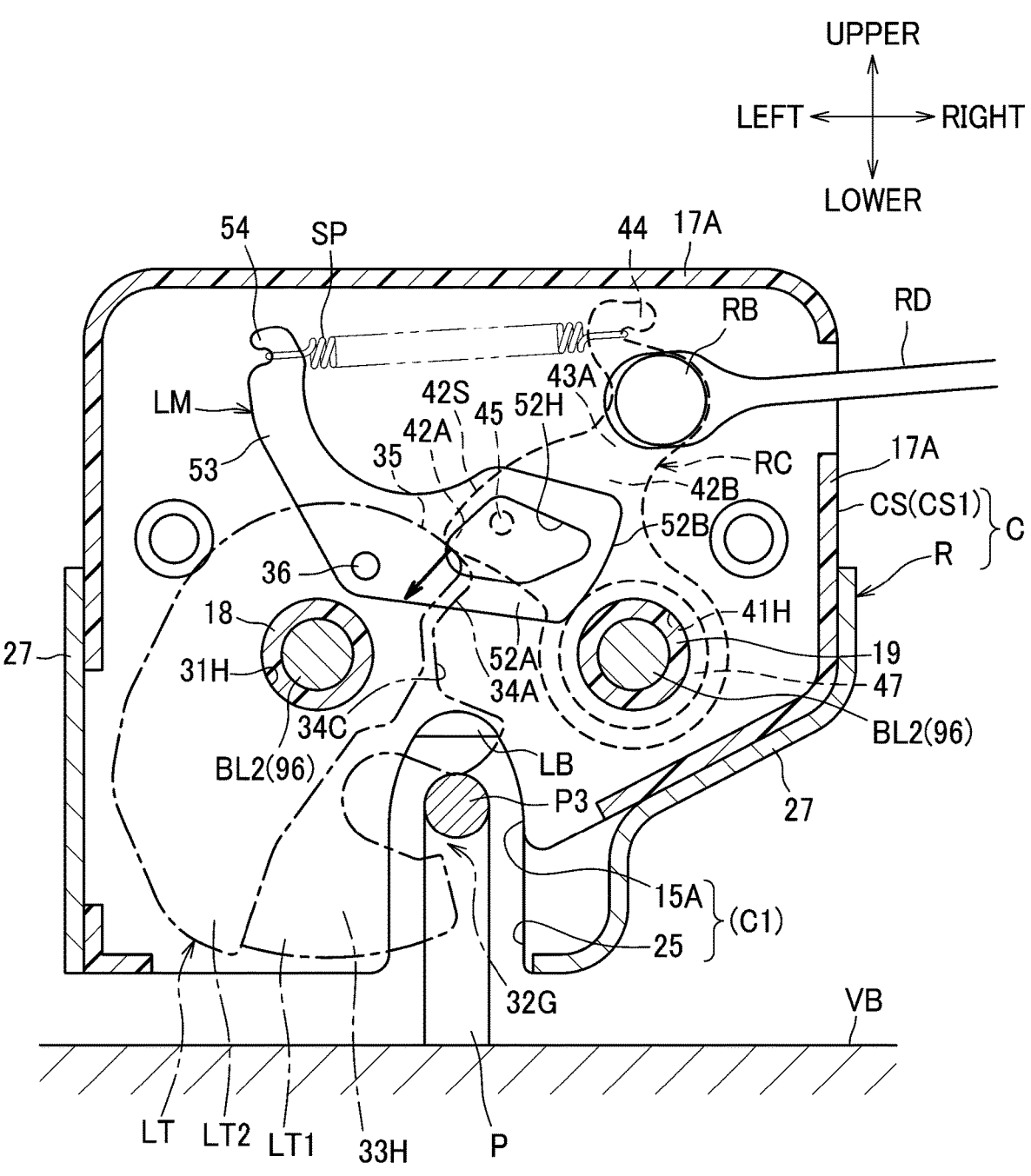

FIG. 26 is a diagram for explaining the movement of the vehicle latch device, showing a state where the rod has been returned and the ratchet is in contact with the latch.

Figure 27:
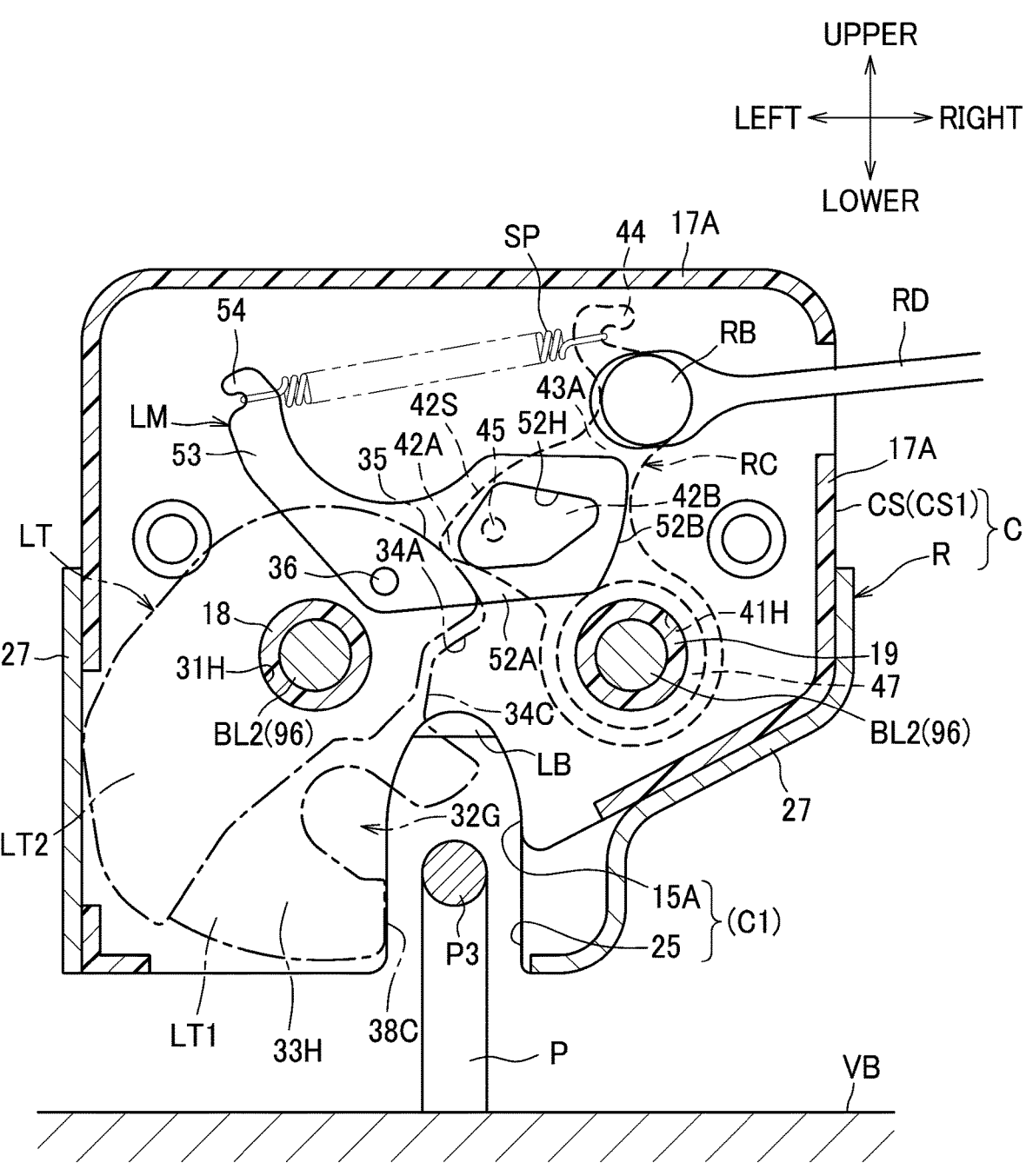

FIG. 27 is a diagram for explaining the movement of the latch device, showing an unlock state.

Figure 28:
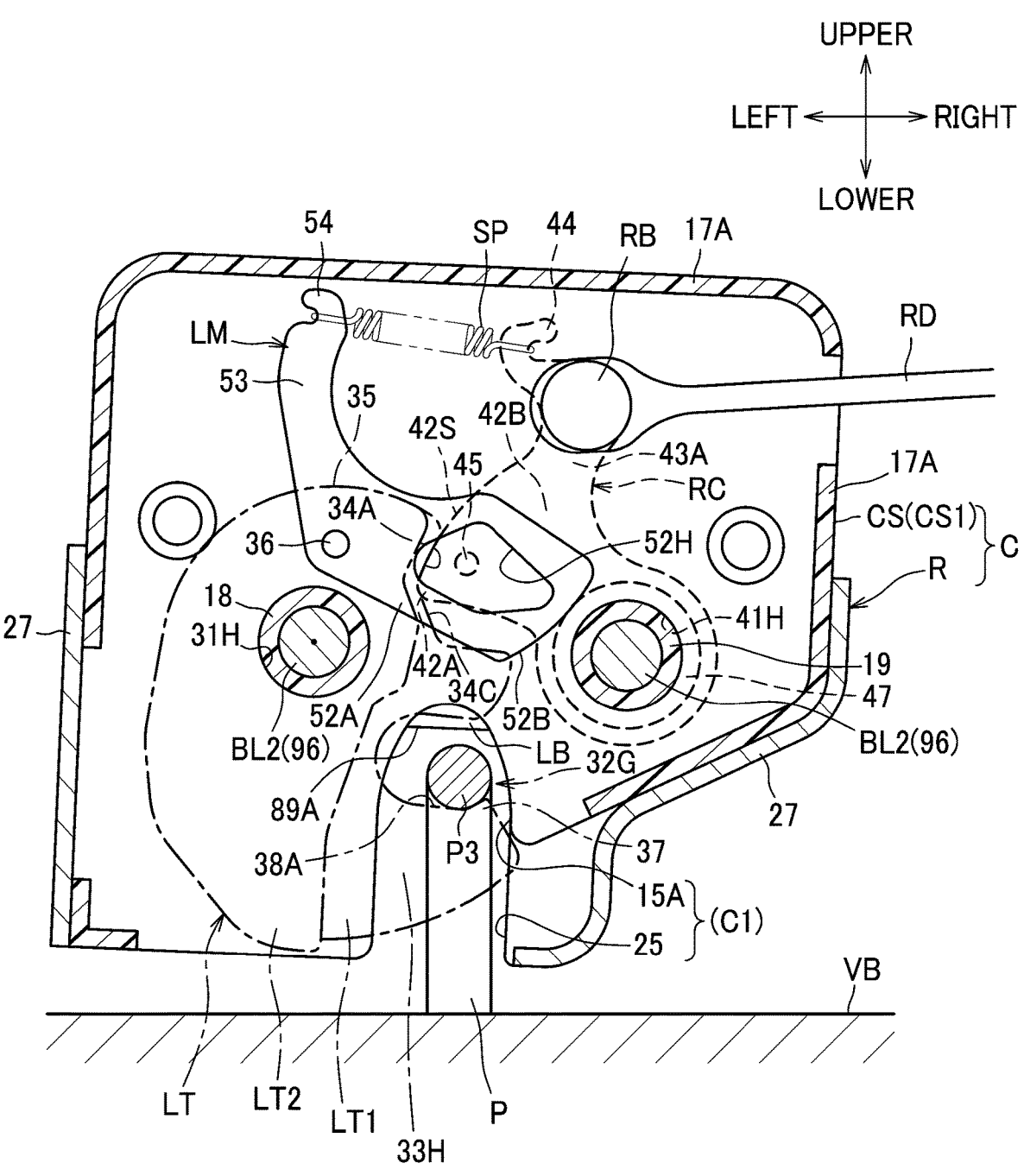

FIG. 28 is a diagram showing the vehicle latch device being pulled upward away from a striker.

Figure 29:
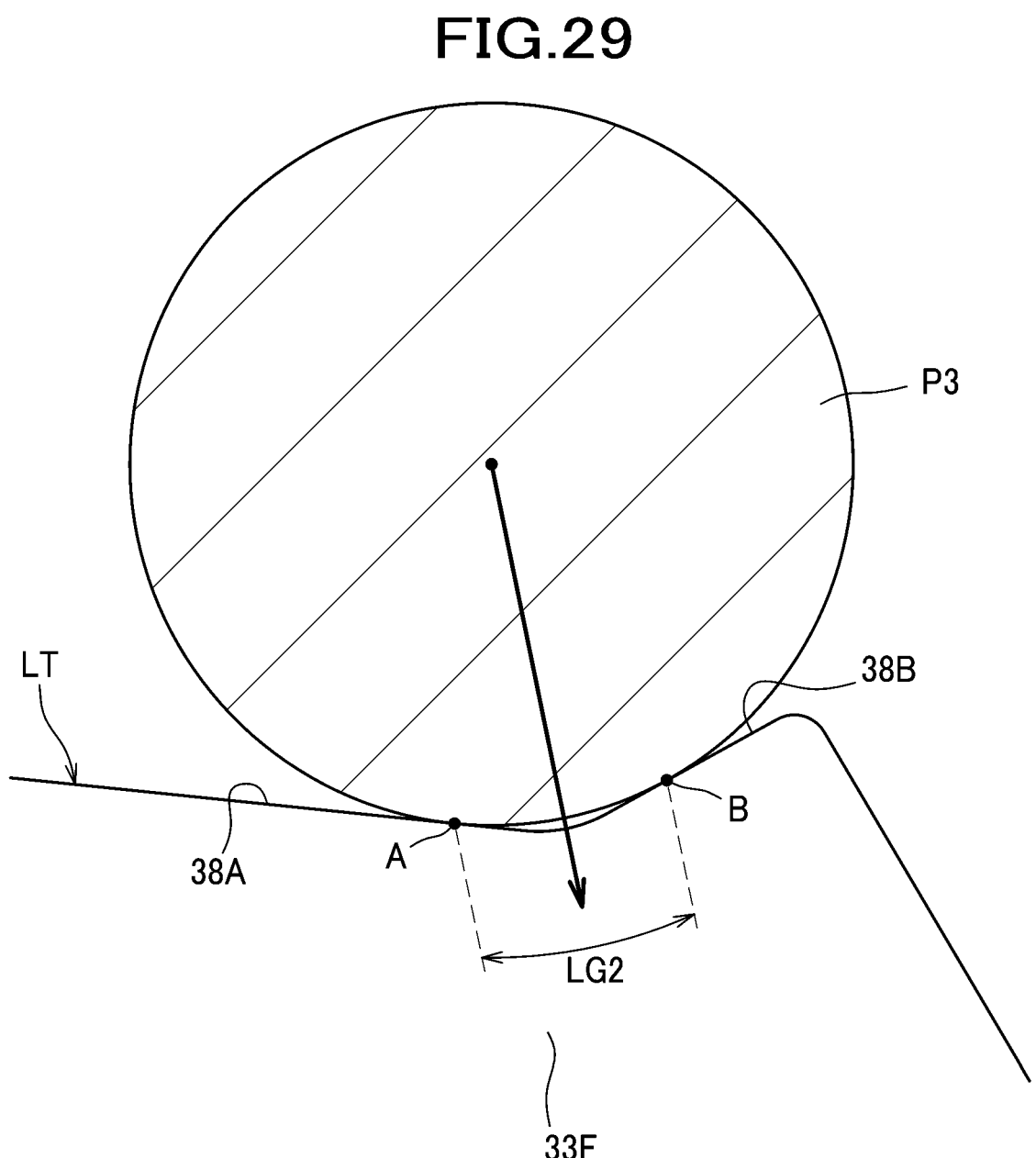

FIG. 29 is a partially enlarged view of FIG. 28.

EMBODIMENTS

Hereafter, a first embodiment of a vehicle seat will be described in detail with reference made to the drawings when appropriate. In the following description, the front/rear (frontward/rearward), left/right (leftward/rightward; lateral), and up/down (upper/lower; upward/downward; vertical) are represented with reference to the front/rear, left/right, and upper/lower directions as viewed from a person seated on the vehicle seat.

Figure 1:
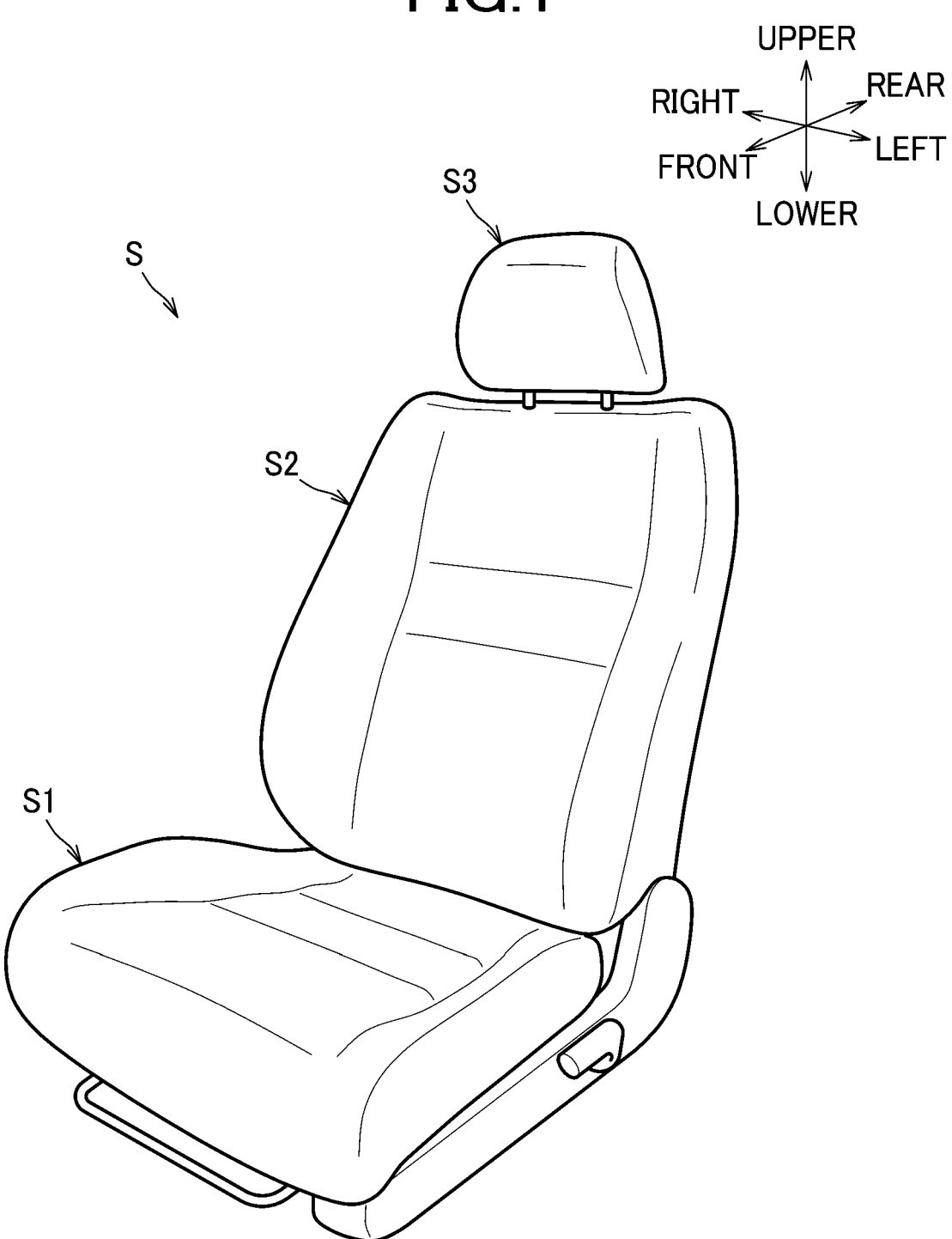
FIG. 1 is a perspective view of a vehicle seat according to a first embodiment.

As seen in FIG. 1, the vehicle seat according to the present embodiment is configured as a car seat S to be installed in an automobile, and includes a seat cushion S1, a seatback S2, and a headrest S3.

The seat cushion S1 includes a cushion frame F1 (refer to FIG. 2), a cushion pad and an outer covering, the cushion frame F1 covered by the cushion pad and the outer covering. The seatback S2 includes a back frame F2 (refer to FIG. 2), a cushion pad and an outer covering, the back frame F2 covered by the pad and the outer covering. The headrest S3 includes a headrest frame, not shown, a cushion pad, and an outer covering, the head rest frame covered by the pad and the outer covering. This is the same in the other embodiments.

Figure 2:
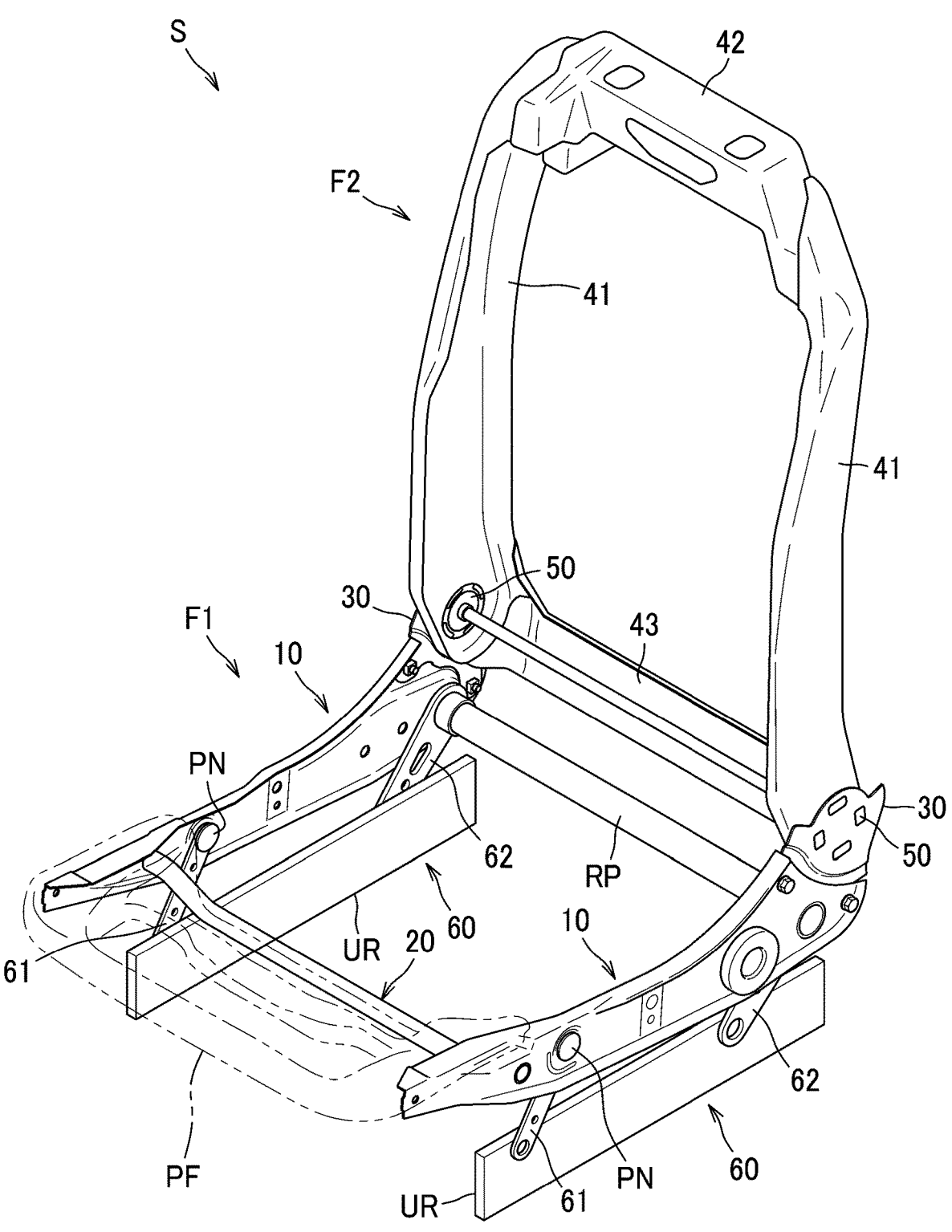
FIG. 2 is a perspective view of a cushion frame and a back frame of the vehicle seat according to the first embodiment.

As shown in FIG. 2, the cushion frame F1 includes cushion side frames 10 as side frames, a pan frame PF, a front pipe 20 as a connecting pipe, a rear pipe RP, and brackets 30. Cushion side frames 10, the pan frame PF, and brackets 30 are plate-shaped members. The front pipe 20 and the rear pipe RP are formed of tubing having a cylindrical shape.

One cushion side frame 10 and one bracket 30 are disposed at each of left and right sides of the cushion frame F1 (seat cushion S1). The cushion side frames 10 extend in the front-rear direction. The brackets 30 are fixed to rear end portions of the cushion side frames 10.

The pan frame PF and the front pipe 20 connect the front end portions of the left and right cushion side frames 10. The rear pipe RP connects the rear end portions of the left and right cushion side frames. The rear pipe RP is straight-shaped and extends in a left-right direction.

The back frame F2 comprises back side frames 41, an upper frame 42, and a lower frame 43. The back side frames 41, the upper frame 42, and the lower frame 43 are plate-shaped members. One back side frame 41 is disposed at each of left and right sides of the back frame F2. The back side frames 41 extend in an upward-downward direction.

The upper frame 42 connects the upper end portions of the left and right back side frames 42. The lower frame 43 connects the lower end portions of the left and right back side frames.

The car seat S further includes a reclining mechanism 50 and a height adjustment mechanism 60. The reclining mechanism 50 is a mechanism that allows the back frame F2 to be tilted with respect to the cushion frame F1. The height adjustment mechanism 60 is a mechanism that adjust the height of the cushion frame F1. One reclining mechanism and one height adjustment mechanism are disposed at each of left and right sides of the cushion frame F1. the back side frames 41 is supported, pivotally via the reclining mechanisms 50, by the brackets 30.

Figure 3A:
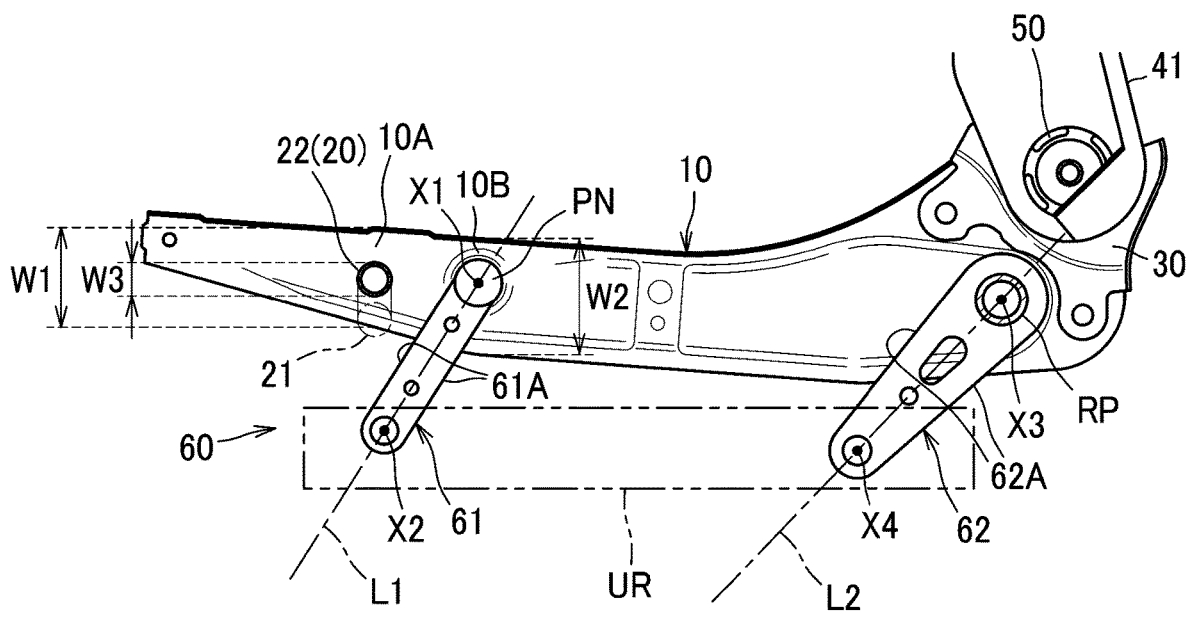
FIG. 3A is a view of a cushion side frame and a height adjustment mechanism of the vehicle seat according to the first embodiment as viewed from its inner side in a left or right direction, showing a state in which the cushion side frame is at the highest position.

As shown in FIG. 3A, each height adjustment mechanism 60 comprises a front link 61 and a rear link 62 located rearward apart from the front link 61. The front link 61 and the rear link 62 are examples of a link. Upper ends of the front link 61 and the rear link 62 are pivotally connected to the cushion side frame 10, and lower ends of the front link 61 and the rear link 62 are pivotally connected to an upper rail UR. The upper rail UR is movable in the front-rear directions via a lower rail, not shown in the figures, fixed to a floor of a vehicle body. The upper rail UR is supported by the lower rail in such a manner that the upper rail UR is movable.

The front link 61 is rotatable relative to the cushion side frame 10 about a first axis X1. To be more specific, the upper end portion of the front link 61 is pivotally supported by a pin PN fixed to the cushion side frame 10. The pin PN includes a flange. The front link 61 is rotatable relative to the upper rail UR about a second axis X2.

The rear link 62 is rotatable relative to the cushion side frame 10 about a third rotational axis X3. To be more specific, an upper end of the rear link 62 is pivotally supported by the rear pipe RP. The rear link 62 is rotatable relative to the upper rail UR about a fourth axis X4.

The front link 61 is a straight plate-shaped member. To be more specific, a straight line L1 that connects the first axis X1 and the second axis X2 is located between the two straight side edges 61A of the front link 61. The two side edges 61A are parallel to each other.

The rear link 62 is an approximately straight plate-shaped member. To be more specific, a straight line L2 that connects the third axis X3 and the fourth axis X4 is located between the two straight side edges 62A of the rear link 62. The two side edges 62A are symmetrical with respect to the straight line L2, and inclined toward each other to the straight line L2 from a top end to a bottom end of the rear link 62.

Figure 3B:
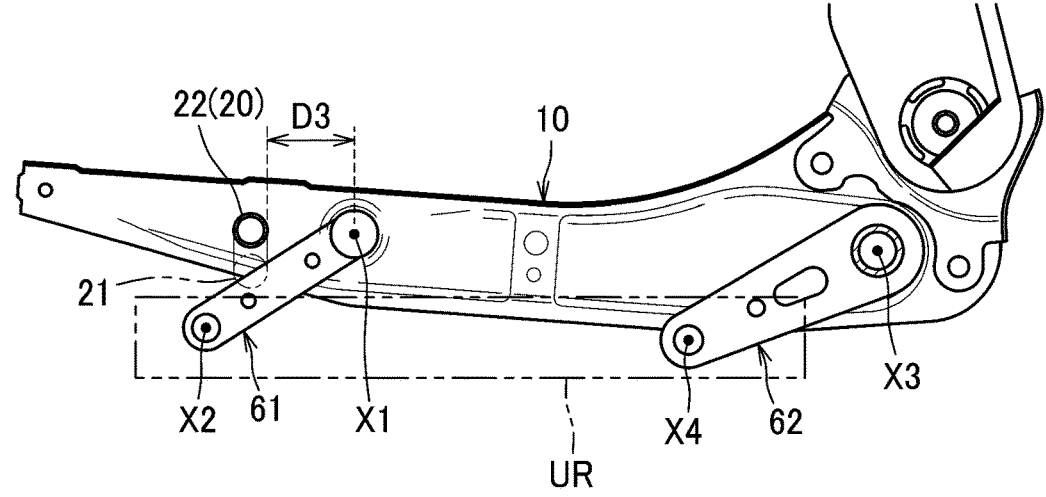
FIG. 3B is a view of the cushion side-fame and the height adjustment mechanism of the vehicle seat according to the first embodiment as viewed from the inner side in the left or right direction, showing a state in which the cushion side frame is at the lowest position.

Each of the front link 61 and the rear link 62 is rotatable between an elevated position shown in FIG. 3A and a lowered position shown in FIG. 3B. The elevated positions of the link 61 and the link 62 are positions in which the cushion side frame 10 is at its highest position. The lowered positions of the link 61 and the link 62 are positions in which the cushion side frame 10 is at its lowest position.

The front pipe 20 is disposed in front of the first axis X1. A distance D3 from the front pipe 20 to the first axis X1 in the front-rear direction is shorter than the length of the front link 61.

The front pipe 20 is disposed above the second axis X2 when the front link 61 is in the elevated position. The front pipe 20 is disposed rearward of a position of the second axis X2 in the front-rear direction and frontward of a position of the first axis X1 in the front-rear direction. The front pipe 20 (specifically, a first part 21 that will be described below) overlaps the front link 61 in the lowered position when seen from the left or right side.

The cushion side frame 10 has a pipe joint part 10A to which the front pipe 20 is joined, and a link connecting part 10B to which the front link 61 is connected. Each of the left and right cushion side frame 10 has a first dimension W1, in the upward-downward direction, corresponding to a portion in which the pipe joint part 10A is provided, and a second dimension W2, in the upward-downward direction, corresponding to a portion in which the link connecting part 10B is provided, the first dimension W1 being smaller than the second dimension W2. The first axis X1 is a rotational axis on which the front link 61 is rotatable relative to the cushion side frame 10 and is disposed within an area W3 of which an extent in the upward-downward direction is coextensive with that of a joining part of the front pipe 20 connected to the cushion side frame 10 (a second part 22 that will be described below).

A part of the front pipe 20 (specifically, a part of the first part 21 which will be described below) does not overlap the cushion side frame 10 when seen from the from the left or right side. In other words, the lower end of the cushion side frame 10 overlaps the first part 21 of the front pipe 20 when seen from the left or right side.

Figure 4:
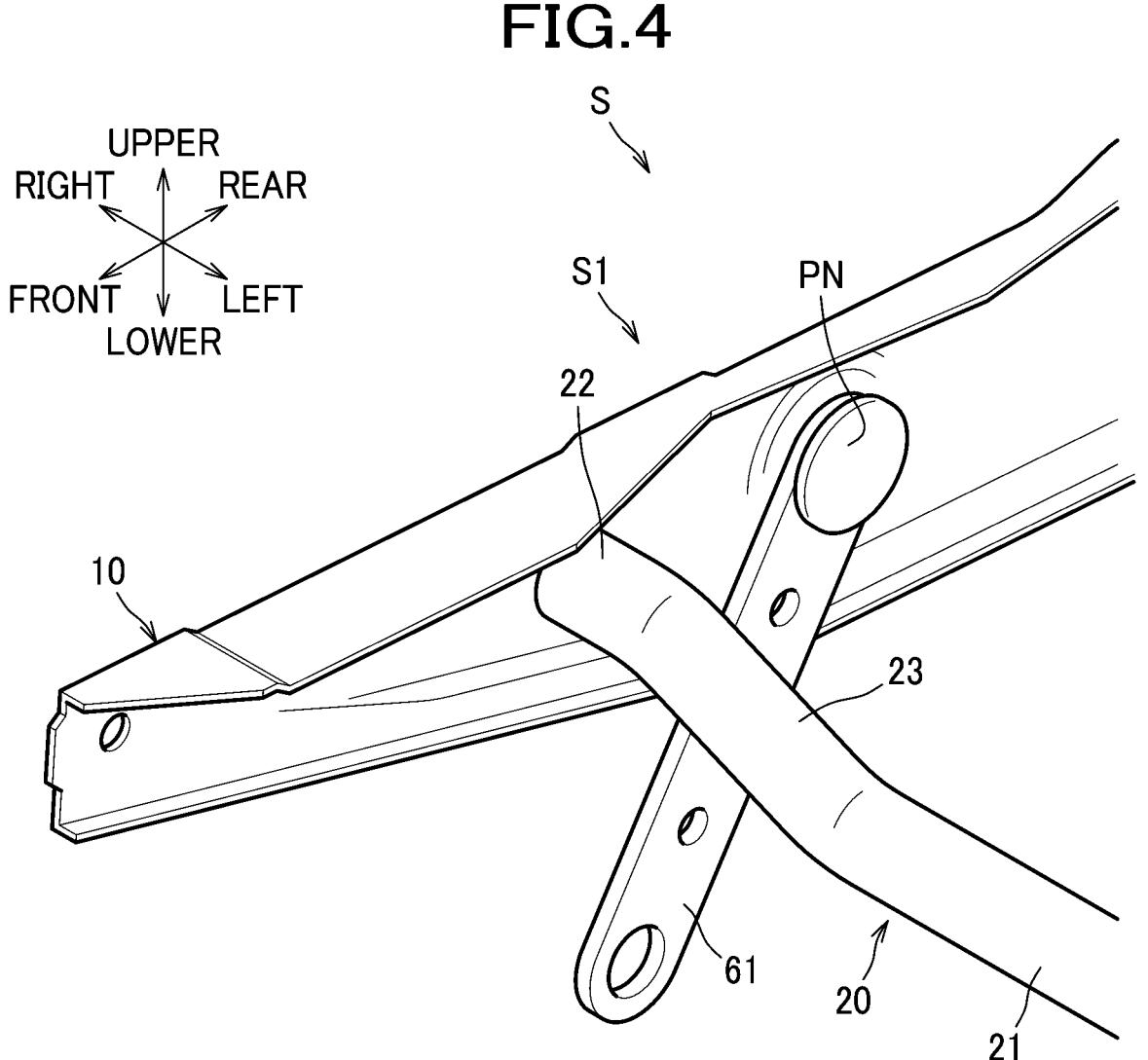
FIG. 4 is a perspective view showing a structure of a right end portion of a front pipe and its vicinity, of the vehicle seat according to the first embodiment.

As shown in FIG. 4, the front pipe 20 includes a first part 21 that extends in the left-right direction, a second part 22 disposed at a position higher than a position of the first part 21 and fixed to the cushion side frame 10 by welding or the like, and a third part 23 that bends upward from the first part 21 and connects to the second part 22. The second part 22 and the third part 23 are disposed at each of the left and right ends of the first part 21. The second part 22 is disposed above the front link 61.

Figure 5:
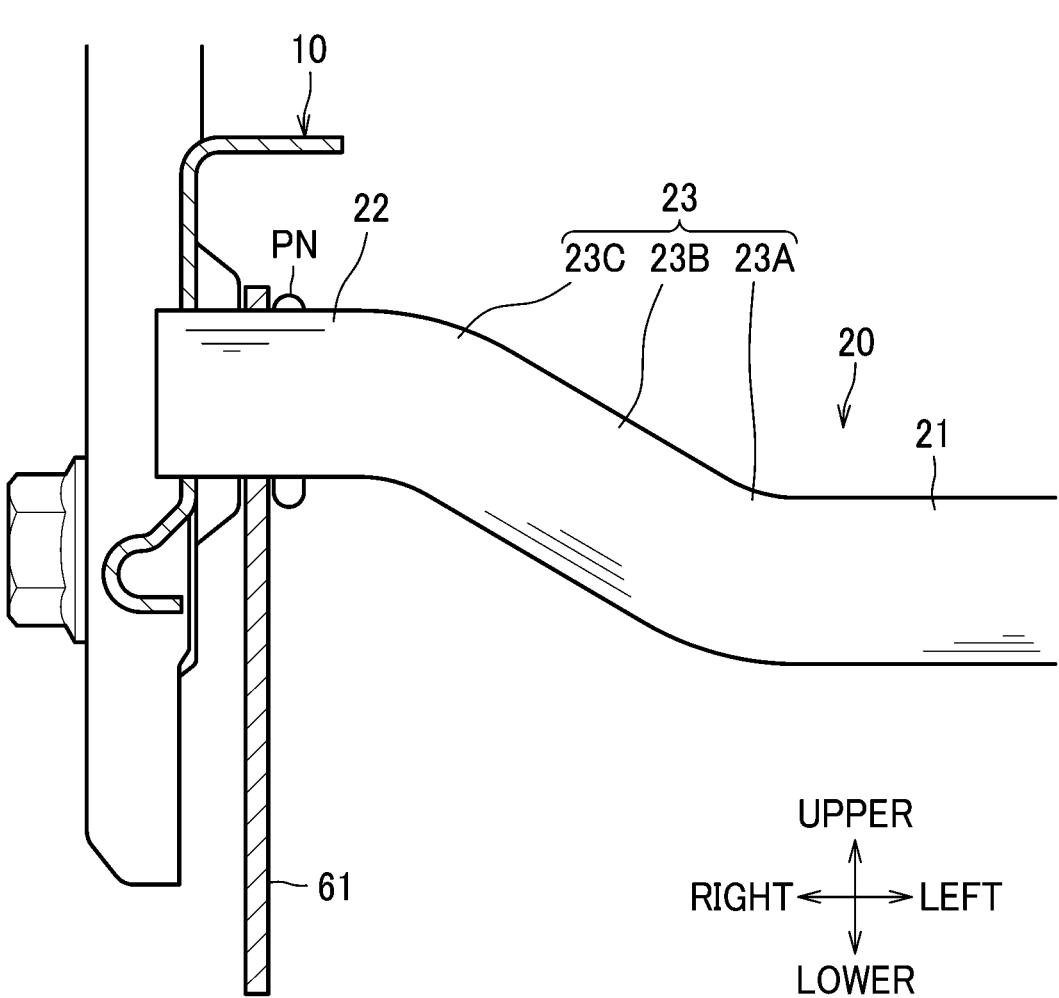
FIG. 5 is a sectional view of the structure of the right end portion of the front pipe and its vicinity, of the vehicle seat according to the first embodiment.

As shown in FIG. 5, the second part 22 extends in the left right direction. The third part 23 includes a first bending part 23A bending upward from the first part 21, a straight part 23B extending obliquely, in a laterally-outward-and upward direction, from the first bending part 23B, and a second bending part 23C bending outward in the left-right direction from the straight part 23B and connecting to the second part 22. The front link 61 is disposed within an area of which an extent in the left-right direction is coextensive with that of the second part 22.

Figure 6A:
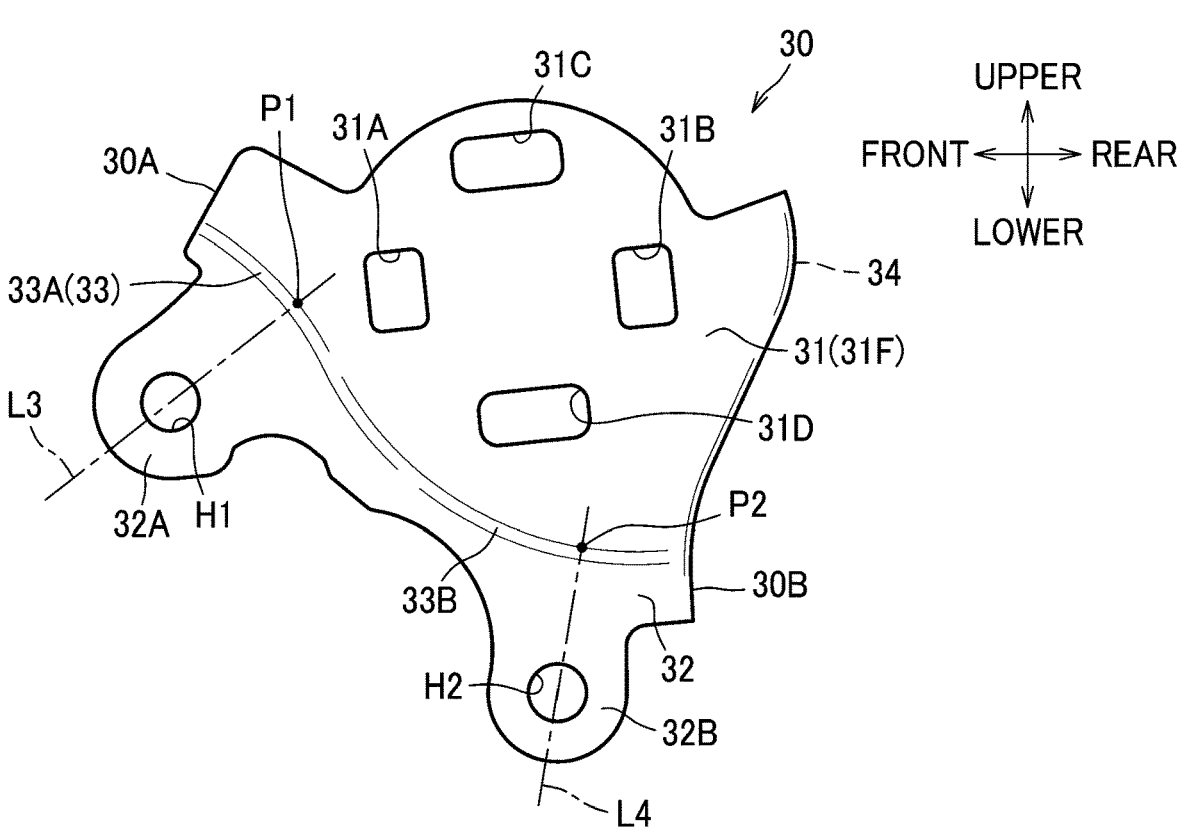
FIG. 6A is a side view of a bracket of the vehicle seat according to the first embodiment as viewed from the outer side in the left or right direction.
Figure 6B:
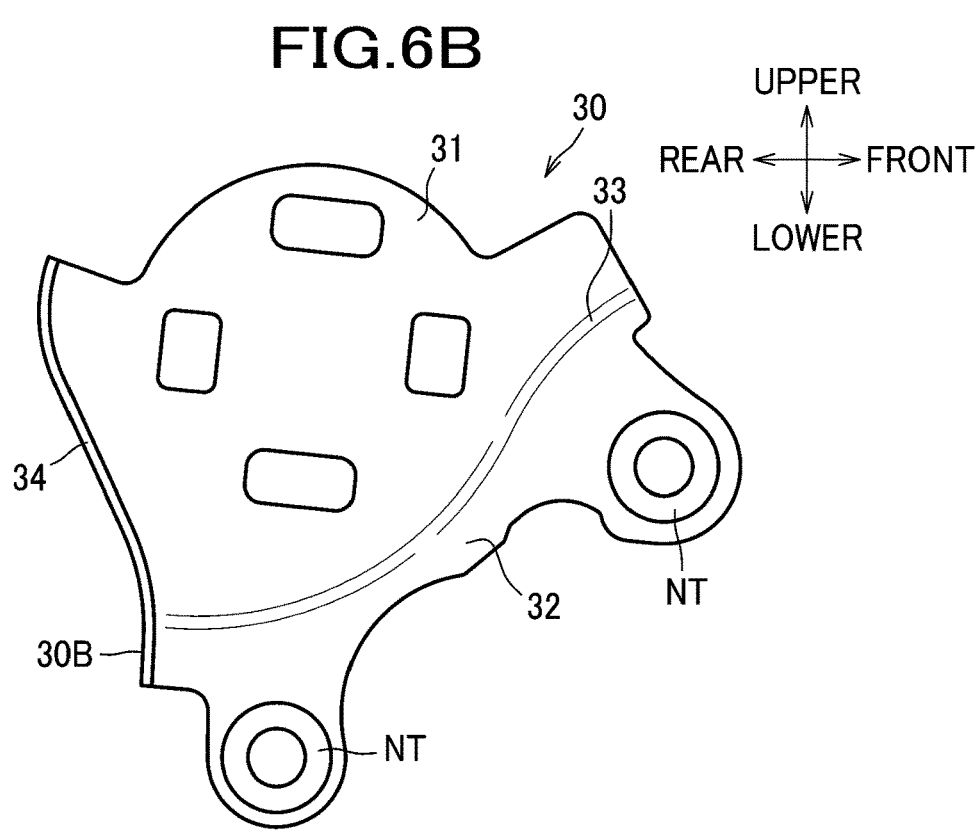
FIG. 6B is a side view of the bracket of the vehicle seat according to the first embodiment as viewed form the inner side in the left or right direction.
Figure 7:
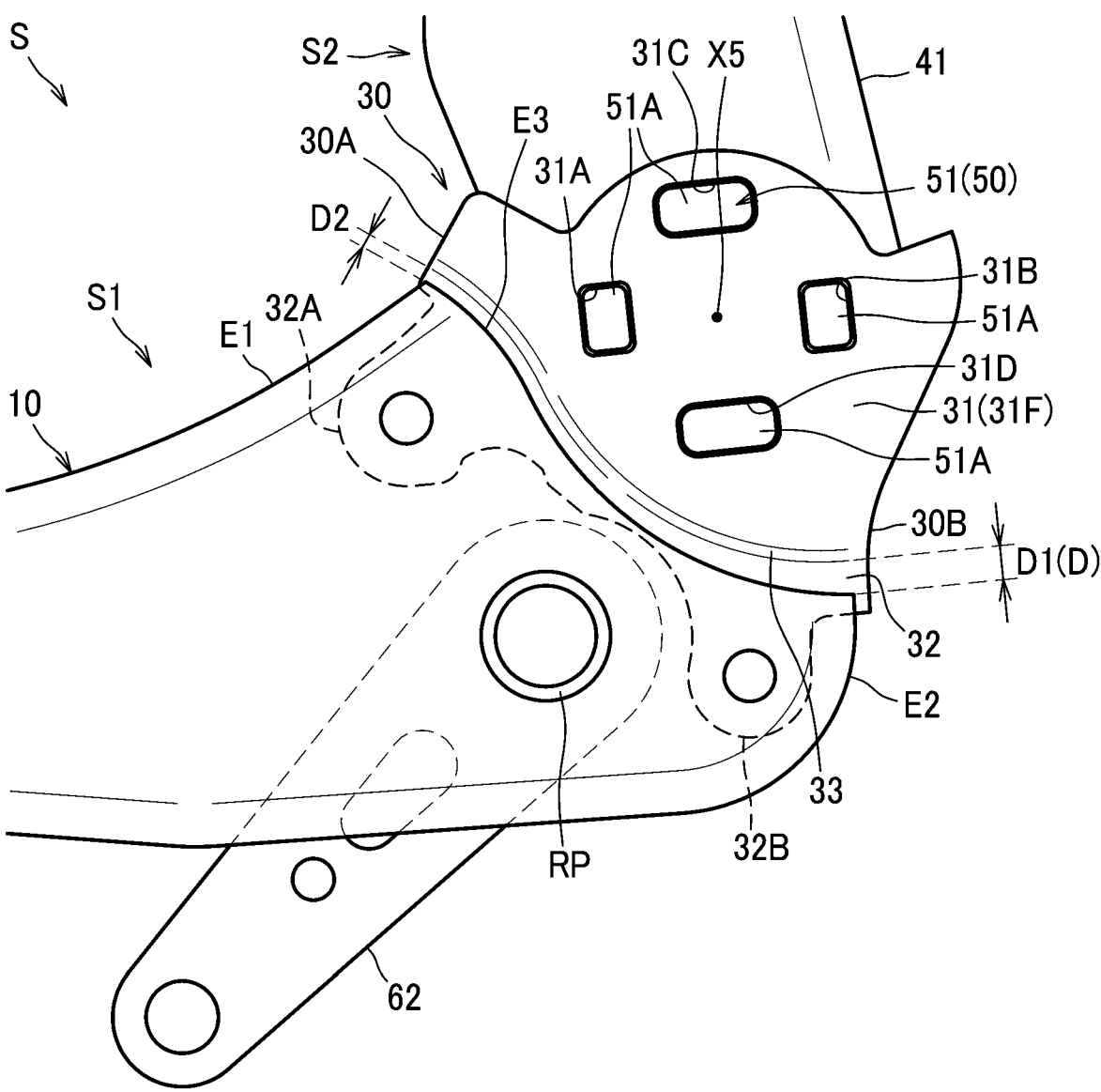
FIG. 7 is a side view of a structure of a left bracket and its vicinity, of the vehicle seat according to the first embodiment as viewed from the left side.
Figure 8:
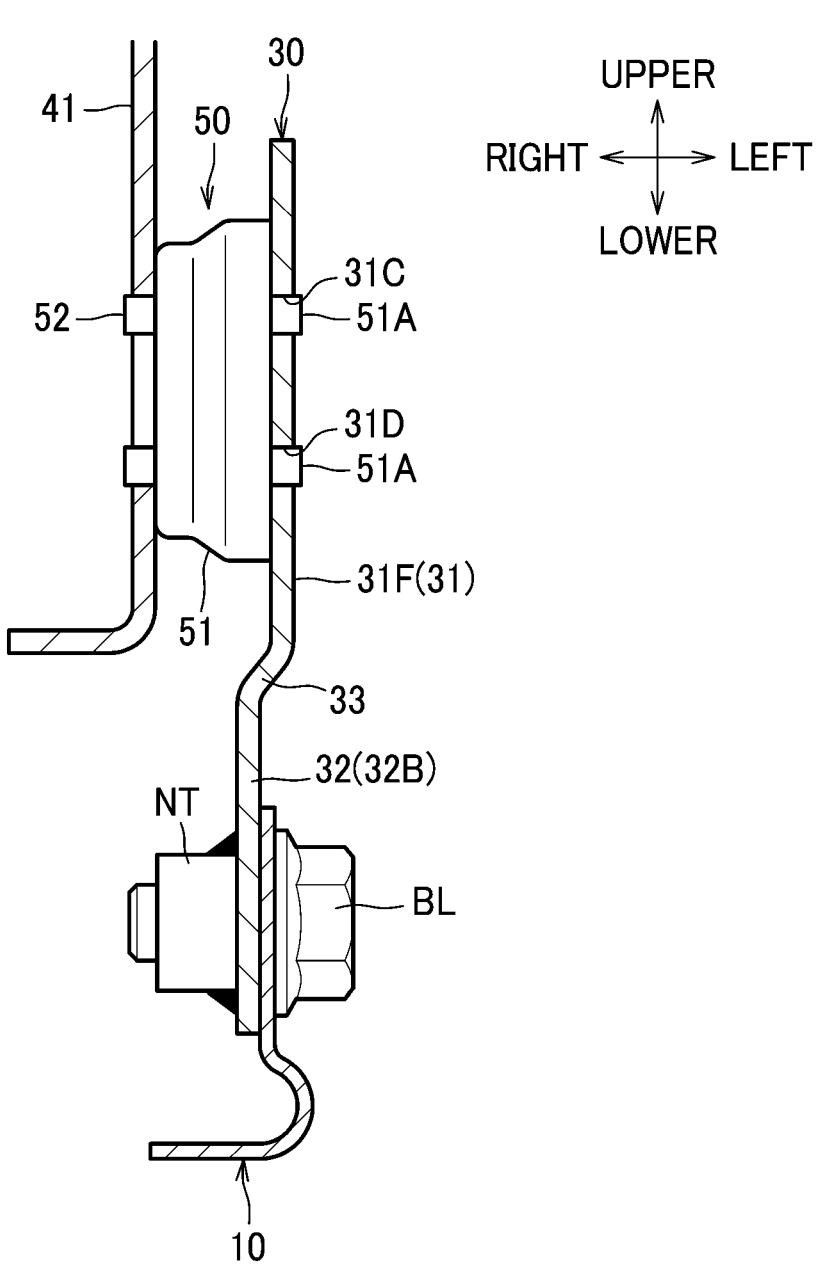
FIG. 8 is a sectional view of the left bracket and its vicinity, of the vehicle seat according to the first embodiment.

As shown in FIG. 6A, FIG. 6B, and FIG. 7, the bracket 30 includes a first plate-shaped part 31 fixed to the back side frame 41 via the reclining mechanism 50, a second plate-shaped part 32 fixed to the cushion side frame 10, a fragile part 33 connected to the first plate-shaped part 31 and to the second plate-shaped part 32, and a flange 34. As shown in FIG. 8, the first plate-shaped part 31 is disposed at an outer side of the back side frame 41 in the left-right direction. The second plate-shaped part 32 is disposed at an inner side of the cushion side frame 10 in the left-right direction. The first plate-shaped part 31 is disposed at the outer side of the second plate-shaped member 32 in the left-right direction.

The reclining mechanism 50 includes a fixing member 51 fixed to the bracket 30 and a movable member 52 rotatably supported by the fixing member 51. The movable member 52 is fixed to the lower ends of the back side frame 41 by welding or the like.

As shown in FIG. 6A, FIG. 6B, and FIG. 7, the first plate-shaped part 31 includes a first hole 31A, a second hole 31B, a third hole 31C, and a fourth hole 31D for fixing the fixing member 51 of the reclining mechanism 50 to the bracket 30. The first hole 31A and the second hole 31B are spaced apart from each other in the front-rear direction. The third hole 31C and the fourth hole 31D are spaced apart from each other in the upward-downward direction. The third hole 31C and the fourth hole 31D are disposed between the first hole 31A and the second hole 31B in the front-rear direction. The third hole 31C is disposed above the first hole 31A and the second hole 31B in the upward-downward direction. The fourth hole 31D is disposed below the first hole 31A and the second hole 31B in the upward-downward direction.

The fixing part 51 includes four bosses 51A. The four bosses 51A are spaced apart from each other on a circle the center of which coincides with the rotational axis X5. One boss 51A is placed in the first hole 31A and another boss 51A is placed in the second hole 31B. One of the remaining two bosses 51A is placed in the third hole 31C, and the other is placed in the fourth hole 31D. The bosses 51A are welded respectively to the corresponding holes 31A to 31D.

The second plate-shaped part 32 includes a first fixing part 32A and a second fixing part 32B both fixed to the cushion side frame 10. The first fixing part 32A has a hole H1 for a bolt BL to be put therethrough, and the second fixing part 32B has a hole H2 for a bolt BL to be put therethrough (refer to FIG. 8).

The laterally outer side surfaces of the first fixing part 32A and the second fixing part 32B come in contact with the laterally inner side surfaces of the cushion side frame 10. As shown in FIG. 6B and FIG. 8, a nut NT for the bolt BL to be tightened therein is fixed to the laterally inner side surface of each of the first fixing member 32A and the second fixing member 32B.

The fragile part 33 is a part that deforms first when there is an impact on the bracket in a collision of a car, for example. As shown in FIG. 8, the fragile part 33 has a shape which extends from the lower end of the first plate-shaped part 31 obliquely to the right, i.e., inward in the left-right direction, then extends downward and connects to the second plate-shaped part 32. In other words, the fragile part 33 does not jut out outward, in the left-right direction, from the outer surface 31F which is the outer surface of the first plate-shaped part 31 facing outward in the left-right direction (refer to FIG. 8).

As shown in FIG. 7, the fragile part 33 extends from the first fixing part 32A to the second fixing part 32B. Specifically, the fragile part 33 extends from a front end 30A of the bracket 30 to the rear end 30B of the bracket 30. A rear part of an upper end E1 of the cushion side frame 10 extends in an obliquely rearward and upward direction. The front end 30A of the bracket 30 extends in the obliquely rearward and upward direction approximately along an extension line of the rear part of the upper end E1 of the cushion side frame 10.

The cushion side frame 10 includes a first rear end E2 and a second rear end E3 located above the first rear end E2. The upper part of the first rear end E2 extends in the upward direction. The second rear end E3 sinuously extends from the upper end of the first rear end E2 in an obliquely frontward and upward direction and connects to the upper end E1. The rear end 30B of the bracket 30 extends upward approximately along an extension line of the upper part of the first rear end E2. The fragile part 33 extends from the upper end E1 to the first rear end E2 of the cushion side frame 10.

There is a space D between the fragile part 33 and the second rear end E3 of the cushion side frame 10. A space D1 between the rear end of the fragile part 33 and the second rear end E3 is larger than a space D2 between the front end of the fragile part 33 and the second rear end E3.

As shown in FIG. 6A, the fragile part 33 includes a first arc-shaped part 33A jutting out in an obliquely-upward-and-rearward direction and a second arc-shaped part 33B jutting out in a downward direction when seen from the left or right side. The first arc-shaped part 33A includes a front end of the bracket 30. The second arc-shaped part 33B extends from a rear end of the first arc-shaped part 33A to a rear end of the bracket 30.

The first fixing part 32A, specifically the hole H1, is located on a first normal line L3, at a predetermined first point P1, of the first arc-shaped part 33A. The second fixing part 32B, specifically the hole H2, is located on a second normal line L4, at a predetermined point P2, of the second arc-shaped part 33B.

As shown in FIG. 6A and FIG. 6B, the flange 34 bends laterally inward from the rear end 30B of the bracket 30. The flange 34 extends from the first plate-shaped part 31 across the fragile part 33 to the second plate-shaped part 32.

Figures 9A, 9B, 9C:
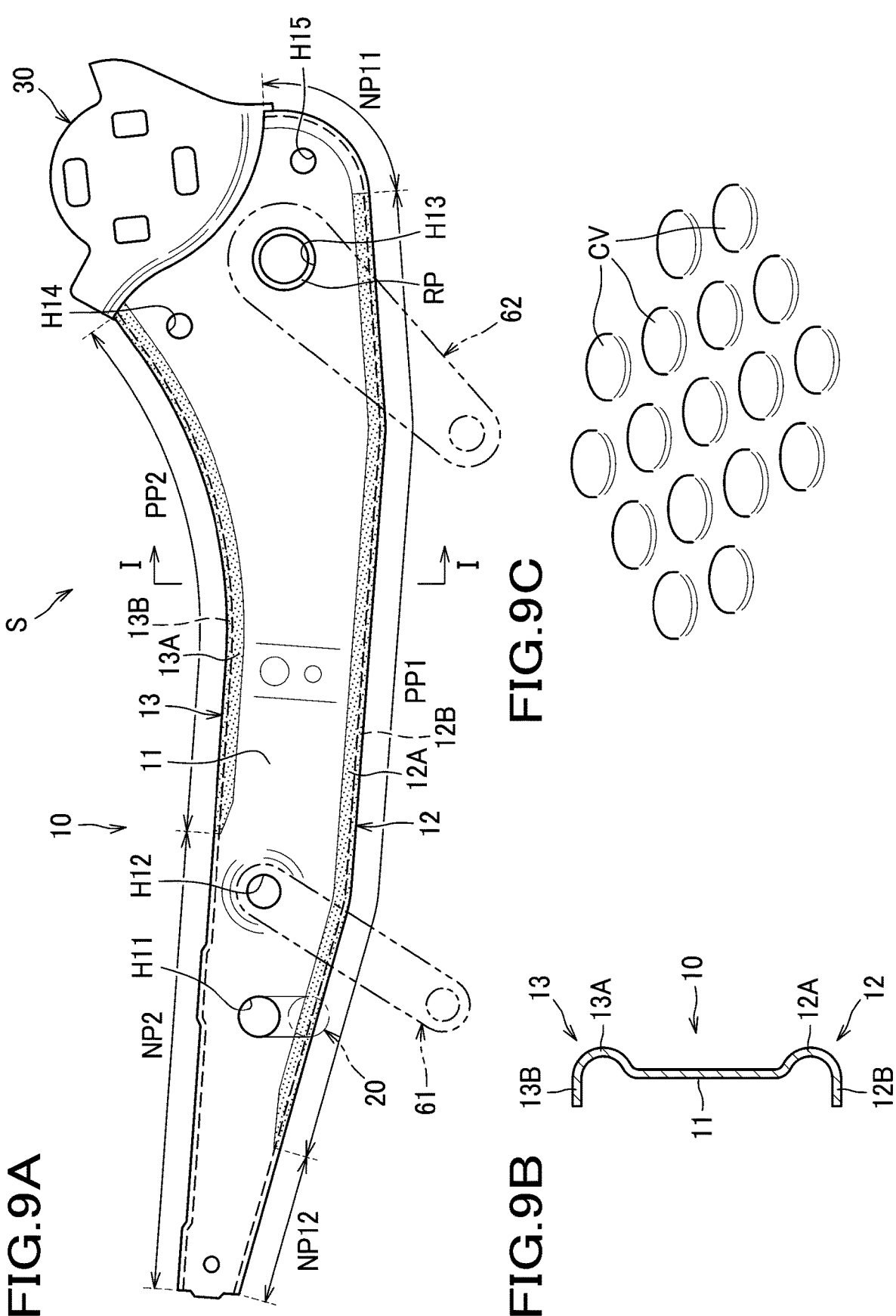
FIG. 9A is a side view showing a processed part and a non-processed part thereof of the cushion side frame of the vehicle seat according to the first embodiment.
FIG. 9B is a sectional view taken along line I-I of FIG. 9A.
FIG. 9C is an enlarged perspective view of bulges of the processed part.

As shown in FIG. 9A, each of the cushion side frame 10 includes a plate-shaped base wall 11 elongate in the front-rear direction, a first flange part 12 located at the lower end of the base wall 11 (one of the longer side edges of the base wall 11), and a second flange part 13 located at the upper end of the base wall 11 (the other longer side edge of the base wall 11). The base wall 11 has a surface that crosses, specifically, is perpendicular to, the left-right direction. The base wall 11 includes a first fixing hole H11 to which the corresponding end of the front pipe 20 is inserted, a second fixing hole H12 to which a pin PN (refer to FIG. 4) is inserted, and a third fixing hole 13 to which the corresponding end of the rear pipe RP is inserted.

The base wall 11 further includes a fourth fixing hole H14 for fixing the first fixing part 32A of the bracket 30 and a fifth hole H15 for fixing the second fixing part 32B of the bracket 30. The fourth fixing hole H14 is located in a position frontward of a position of the rear pipe RP and the fifth fixing hole H15 is located in a position rearward of a position of the rear pipe RP.

As shown in FIG. 9B, the first flange part 12 includes a bending part 12A and a flat plate part 12B. The bending part 12A bends outward in the left-right direction from the lower end of the base wall 11, then bends back inward in the left-right direction. The flat plate-shaped part 12B extends inward in the left-right direction (a direction perpendicular to the base wall 11) from the laterally inner end of the bending part 12A. The flat plate part 12B protrudes inward of the base wall 11 in the left-right direction.

The second flange part 13 includes a bending part 13A and a flat plate-shaped part 13B. The bending part 13A bends outward in the left-right direction from the lower end of the base wall 11, then bends back inward in the left-right direction. The flat plate-shaped part 13B extends inward in the left-right direction (a direction perpendicular to the base wall 11) from the laterally inner end of the bending part 13A. The flat plate part 13B protrudes inward of the base wall 11 in the left-right direction.

As shown in FIG. 9A, the first flange part 12 includes a first processed part PP1 to which a reinforcing process by embossing (hereafter, also referred to as an embossing process) has been subjected and first non-processed parts NP11 and NP12 to which the embossing process has not been subjected. The second flange part 13 includes a second processed part PP2 to which the embossing process has been subjected and second non-processed parts NP2 to which the embossing process has not been subjected.

As shown in FIG. 9C, the first processed part PP1 and the second processed part PP2 includes a plurality of bulges CV formed by the embossing process. The plurality of bulges CV are, for example, aligned and spaced apart from each other in a predetermined direction and aligned and spaced apart from each other in a predetermined direction nonparallel to the predetermined direction.

The first processed part PP1 includes a bending part 12A and a flat plate-shaped part 12B from one end to the other end in the front-rear direction. The second processed part PP2 includes a bending part 13A and a flat plate-shaped part 13B from one end to the other end in the front-rear direction. The aforementioned plurality of bulges CV are formed on the both of the bending parts 12A and 13A, and the flat plate-shaped parts 12B and 13B of the respective processed parts PP1 and PP2. It is however to be understood that the plurality of bulges CV may be formed on at least one of the bending parts and the flat plate-shape parts.

The first non-processed part NP11 includes a rear end of the first flange part 12. The first non-processed part NP12 includes a front end of the first flange part 12. The first processed part PP1 is disposed between the first non-processed part NP11 and the first non-processed part NP12 in the front-rear direction.

The rear first non-processed part NP11 includes the bending part 12A and the flat plate part 12B. The rear first non-processed part NP11 extends from the rear end of the first processed part PP1 in an upwardly curving shape. The front first non-processed part NP12 does not include the bending part 12A, and only includes a flat plate part 12B. Specifically, the front first non-processed parts NP12 bends laterally inwards from the lower end of the base wall 11 and extends inwards in the left-right direction.

The second processed part PP2 includes a rear end of the second flange part 13. The second non-processed part NP2 is disposed in front of the second processed part PP2. The second non-processed part NP2 includes a front end of the second flange part 13. The second non non-processed part NP2 does not include the bending part 13A, and only includes the flat plate part 13B. Specifically, the second non-processed part bends laterally inward from the upper end of the base wall 11 and extends inward in the left-right direction.

A length from one end to another end of the first non-processed part NP11 and NP12 in the front-rear direction is shorter than a length from one end to another end of the first processed part PP1 in the front-rear direction. A length from one end to another end of the second non-processed part NP2 in the front-rear direction is shorter than a length from one end to another end of the second processed part PP2 in the front-rear direction.

A length from one end to the other end of the first processed part PP1 in the front-rear direction is longer than a length from one end to the other end of the second processed part PP2 in the front-rear direction. The second processed part PP2 is disposed within an area of which an extent in the front-rear direction is coextensive with that of the first processed part PP1.

A rear end of the first processed part PP1 is located in a position rearward of a position of the rear pipe RP and frontward of a position of the fifth fixing hole H15. A rear end of the second processed part PP2 is located in a position rearward of the position of the fourth fixing hole H14 and frontward of a position of the rear pipe RP.

A front end of the first processed part PP1 is located in a position frontward of a position of the front pipe 20. A front end of the second processed part PP2 is located in a position rearward of a position of the front link 61.

According to the above, the following advantageous effects can be achieved in the present embodiment.

Since, as shown in FIG. 8, the second plate-shaped parts 32 of the brackets 30 are disposed at laterally inner sides of the cushion side frames 10, the car seat S can be restrained from increasing in size.

Since the first plate-shaped parts 31 are disposed at laterally outer sides of the second plate-shaped parts 32, the cushion side frames 10 can be disposed at laterally inner sides compared to when the first plate-shaped parts and the second plate-shaped parts are disposed at the same position in the lateral direction, for example, and the car seat S can be restrained from increasing in size.

Since the bracket 30 is provided with the fragile part 33, the bracket 30 is made likely to deform at the fragile part 33 in a collision, so the impact can be absorbed by the bracket 30.

Since the fragile part 33 does not protrude laterally outward from the outer surface 31F, a side facing laterally outward, of the first plate-shaped part 31, the car seat S can be restrained from increasing in size in the lateral direction in comparison, for example, with an alternative configuration in which the fragile part protrudes laterally outward from the laterally outer side surface of the first plate-shaped part 31.

As shown in FIG. 7, since the fragile parts 33 extends from the front end to the rear end of the bracket 30, the bracket 30 is made likely to deform when there is a collision in comparison, for example, with an alternative configuration in which a fragile part does not extend to the ends of a bracket.

Since the fragile part 33 extends from the first fixing part 32A to the second fixing part 32B, the impact on the back side frame 41 exerted when there is a collision is absorbed by the fragile part 33, before being transmitted to the first fixing part 32A and the second fixing part 32B, and therefore the damage to the first fixing part 32A and the second fixing part 32B can be reduced.

Since there is a space D between the fragile part 33 and a second rear end E3 of the cushion side frame 10, the bracket 30 can be made likely to deform in such a manner that the first plate-shaped part 31 of the bracket 30 moves toward the second rear end E3 of the cushion side frame 10 (moves downward) when there is a collision.

As shown in FIG. 4, the front pipe 20 has a shape bending around the front link 61, which obviates the necessity to provide a link having a shape bending greatly as that of a conventional link, and therefore the weight of the link can be reduced and accordingly the car seat S can be restrained from being heavier in weight.

Since the front link 61 is straight-shaped, the front link 61 can be made light in weight in comparison with an alternative configuration in which the front link is bent, and therefore the car seat S can be restrained from being heavier in weight.

Since the second part 22 of the front pipe 20 extends in the left-right direction, the space between the front link 61 and the second part 22 in the upward-downward direction can retain a desired size even if the position of the front link 61 is shifted from the normal position in the left-right direction due to an installation position error, as compared to an alternative configuration in which the second part 22 extends obliquely relative to the left-right direction, for example.

Since, as shown in FIGS. 3A and 3B, the first axis X1 which is the axis of rotation of the front link 61 relative to the cushion side frame 10, is disposed within the area W3 of which an extent in the upward-downward direction is coextensive with that of the part joining the front pipe 20 and the cushion side frame 10, the width of the cushion side frame 10 in the upward-downward direction can be made smaller.

Since the dimension in the upward-downward direction corresponding to the portion of the cushion side frame 10 provided with the pipe joint part 10A is smaller than the dimension in the upward-downward direction corresponding to the portion of the cushion side frame 10 provided with the link connecting part 10B the cushion side frame 10 can be made lighter in weight, and therefore the increase of the weight of car seat S can be restrained.

Since at least a part of the first part 21 of the front pipe 20 does not overlap a corresponding cushion side frame when seen from the left or right side, the cushion side frame 10 can be made smaller in the upward-downward direction in comparison with an alternative configuration in which all of a first part overlaps a cushion side frame.

As shown in FIG. 9A, since flange parts 12 and 13 respectively include processed parts PP1 and PP2 to which the embossing process has been subjected, the rigidity of the cushion side frame 10 can be increased.

Since the first flange part 12 includes non-processed parts NP11 to which the embossing process has not been subjected, the non-processed parts NP11 can be utilized as a part for absorbing the impact of a collision.

Since the first processed part PP1 includes the plurality of bulges CV formed by the embossing process, the rigidity of the processed part PP1 can be increased by the plurality of bulges CV.

Since the first non-processed part NP11 is disposed at the rear end of the first flange part 12, the non-processed part NP11 disposed at the rear end of the cushion side frames 10 can be caused to deform together with the bracket 30 when there is a collision, and therefore impact can be absorbed by the deformation of the bracket 30 and the non-processed part NP11.

Since the length from one end to the other end of the non-processed parts NP11 and NP12 in the front-rear direction is shorter than the length from one end to the other end of the processed part PP1 in the front-rear direction, the rigidity of the cushion side frame 10 can be increased in comparison with an alternative configuration in which the length of the first processed part is shorter than the length of the first non-processed part, for example.

Since the second processed part PP2 is disposed at the rear side of the second flange part 13, the rigidity of the rear side part of the second flange part 13, on which a heavy load is imposed from an occupant, can be increased by the second processed part PP2. Also, since a front side of the second flange part 13 is the second non-processed part NP2, the positions and the shapes of portions such as the hole for attaching other members can be made more accurate.

Since the length from one end to the other of the second non-processed part NP2 in the front-rear direction is shorter than the length from one end to the other of the second processed part PP2 in the front-rear direction, the rigidity of the cushion side frames 10 can be increased in comparison with an alternative configuration in which the length of the second processed part is shorter than the length of the second non-processed part, for example.

Since the length from one end to the other of the first processed part PP1 in the front-rear direction is longer than the length from one end to the other of the second processed part PP2 in the front-rear direction, the rigidity of the downward part of the cushion side frames 10 can be increased.

Since the second processed part PP2 is disposed within an area of which an extent in the front-rear direction is coextensive with that of the first processed part PP, the rigidity of the cushion side frames 10 can be increased in comparison with an alternative configuration in which the second processed part is disposed outside of the area of which an extent in the front-rear direction is coextensive with that of the first processed part, for example.

The present disclosure may be used in various embodiments as is shown below.

In the above-described embodiment, the first plate-shaped parts 31 are disposed laterally outward of the second plate-shaped parts 32, but the first plate-shaped parts and the second plate-shaped parts may be disposed at positions that are on the same side in the left-right direction, for example.

In the above-described embodiment, the bracket 30 is provided with the fragile part 33, but the bracket may not include the fragile part.

The configuration of the front pipe 20 including the first part 21, the second part 22, and the third part 23 may be applied to other connecting pipes connecting the left and right cushion side frames, such as a rear pipe, for example. Also, the link is not limited to the link included in the height adjustment mechanism, and may be any link as long as the link is pivotally connected to the cushion side frames.

The embossing process is not limited to the flanges 12 and 13 of the cushion side frames 10, and may be subjected to flange parts of the back side frames, for example. That is, the embossing process may be subjected to any flange part of the side frames. The reinforcing process of the flange part is also not limited to the emboss process, and may be a process of quenching. An induction hardening, a laser hardening, etc. may be adopted as the quenching process.

The reinforcing process subjected to the flange part may be applied to at least a part of the flange, and thus may be applied to all of the flange part, for example. In other words, the flange part may be configured to only include the processed part but not include any non-processed part. The reinforcing process may be subjected to the base wall in addition to the flange part.

In the above-described embodiment, the bending parts 12A and 13B of the flange parts 12 and 13 are configured to protrude outward in the left-right direction, but the bending parts of the flange part may not protrude outward in the left-right direction and may be bent to protrude laterally inward.

In the above-described embodiment, the fragile part 33 is configured such that the fragile part does not protrude outward in the left-right direction from the outer surface 31F of the first plate-shaped part 31, but the fragile part may, for example, be bent to protrude laterally outward from an outer surface of the first plate-shaped part.

In the above-described embodiment, a car seat S to be installed in an automobile is given as an example of a vehicle seat, but various aspects of the above-described embodiment may be applied to the vehicle seat for other vehicles such ships and airplanes as well.

Next, a second embodiment of a vehicle seat will be described in detail with reference to the drawings where appropriate.

Figure 10:
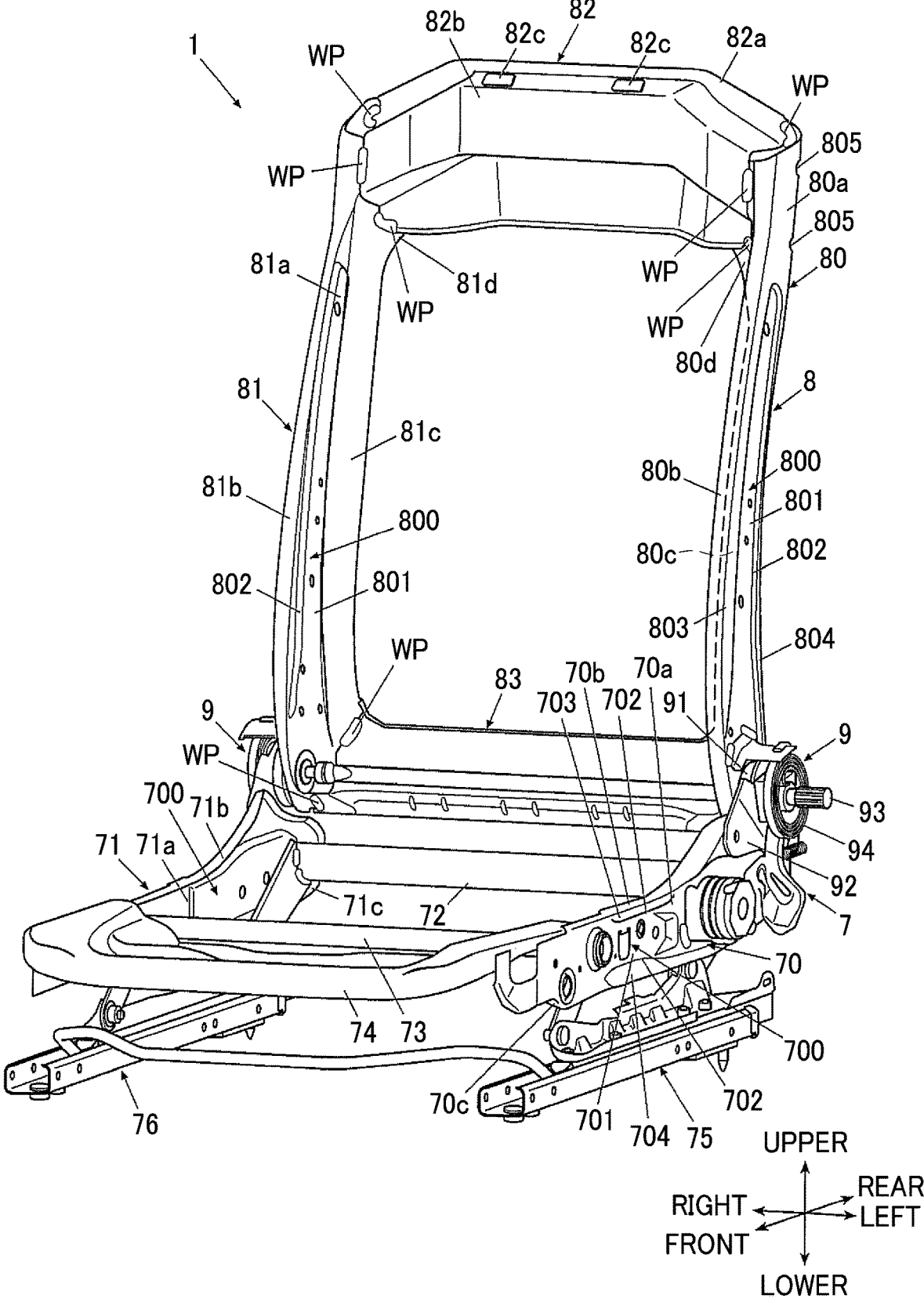
FIG. 10 is a perspective view of a seat frame of a vehicle seat according to a second embodiment.
Figure 11:
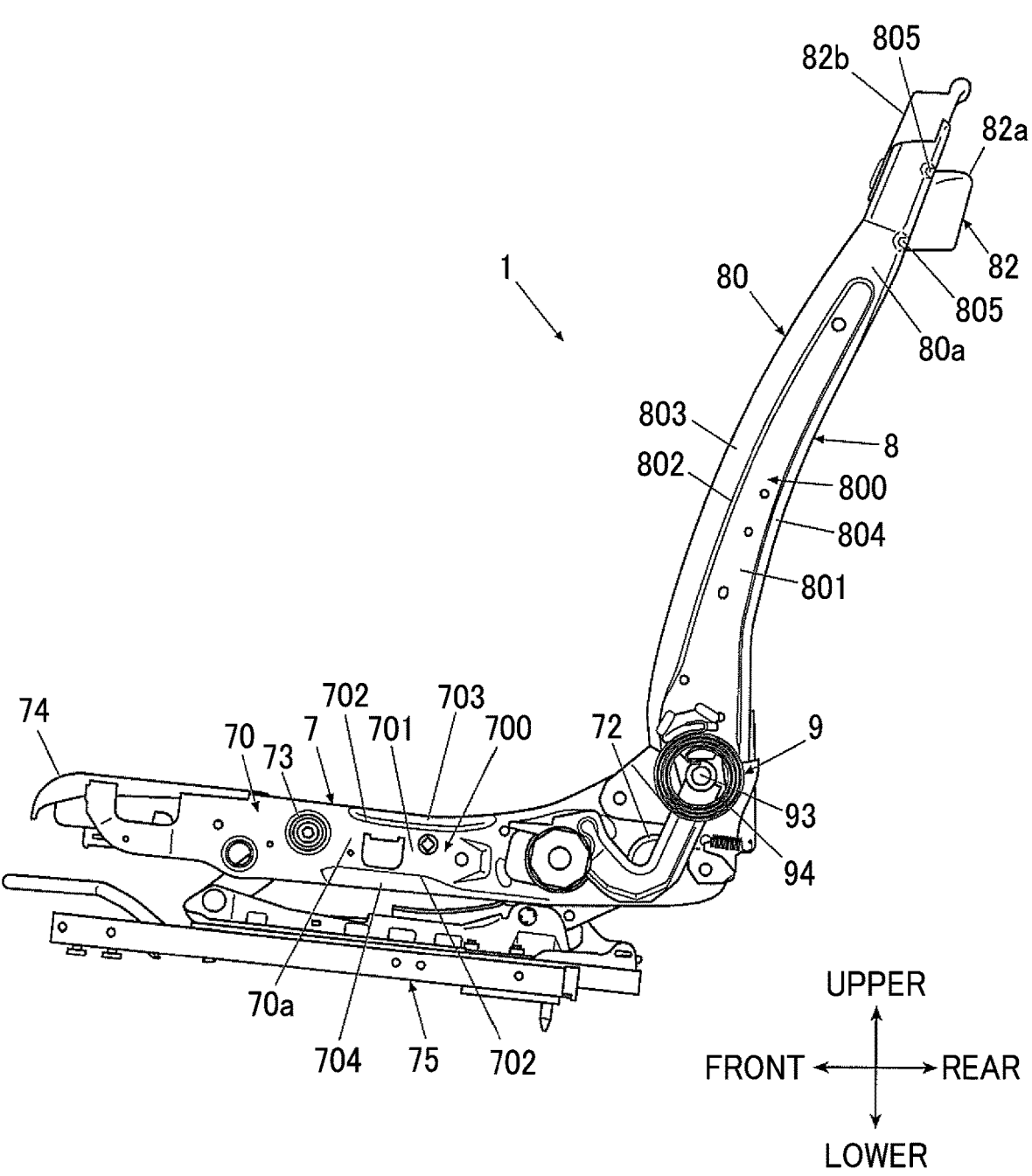
FIG. 11 is a side view of the seat frame of the vehicle seat according to the second embodiment.

As shown in FIG. 10 and FIG. 11, a seat frame 1 includes a seat cushion frame 7 constituting a framework of a seat cushion, a seatback frame 8 constituting a framework of a seatback, a reclining mechanism 9, and a headrest frame (not shown in the figures) constituting a framework of a headrest (not shown in the figures).

The seatback frame 8 mainly includes a pair of left and right back side frames 80 and 81, an upper frame 82 connecting upper end portions of the back side frames 80 and 81, and a lower frame 83 connecting lower end portions of the back side frames 80 and 81.

The pair of left and right back side frames 80 and 81 has a shape elongate in the upward-downward direction, and is connected to the seat cushion frame 7 via the reclining mechanism 9.

The upper frame 82 is formed by sheet metal working, and left and right end portions of the upper frame 82 are welded to the upper end portions of the pair of left and right back side frames 80 and 81 (weld WP).

The upper frame 82 includes a rear part plate 82a located at the rear side, and a front part plate 82b located at the front side.

Lower end portions and upper end portions at the left and right end portions of the rear part plate 82a are welded to rear surface plates 80c and 81c of the pair of left and right back side frames 80 and 81.

The front part plate 82b is integrally formed with the rear part plate 82a in such a manner that the front part plate 82b protrudes frontward from the front surface of the rear part plate 82a. Left and right end portions of the front part plate 82b are also welded to a front surface plate part 80b of the upper end portions of the pair of left and right back side frames 80 and 81.

Further, receptacle holes 82c in which headrest guides for holding headrest pillars are inserted are formed at an upper end portion of the front part plate 82b.

The lower frame 83 is formed by sheet metal working, and left and right end portions of the lower frame 83 are welded to the rear part sides of the lower end portions of the pair of left and right back side frames 80 and 81 (weld WP).

The lower frame 83 has a such a shape curved to protrude from the rear toward the front, as to fit the shape of the lower end portions of the pair of left and right back side frames 80 and 81, when seen from the left or right side. Lower end portions of the lower frame 83 shaped as stated above are welded to the rear surface plate part 80c of the lower end portions of the pair of left and right back side frames 80 and 81. The front end portions of the lower frame 83 are also welded to the front surface plate part 80b of the lower end portions of the pair of left and right back side frames 80 and 81.

The pair of left and right back side frames 80 and 81 is formed symmetrically, and therefore only the left side frame 80 will be described in detail hereafter and a detailed description of the right back side frame 81 will be omitted.

The back side frame 80 includes a side surface plate part 80a, a front surface plate part 80b formed integrally with the front edge part of the side surface plate part 80a, and the rear surface plate 80c formed integrally with the rear edge part of the side surface plate part 80a. The back side frame has an approximately U-shaped cross section.

The upper end portion of the rear surface plate part 80c has a shape broader in the laterally inner direction, and forms a broad part 80d to which the rear part plate 82a is welded.

A denting part 800 is formed at a part corresponding to the central part of the back side frame 80 (the part between the upper end portion and the lower end portion) of the side surface plate part 80a.

In the present embodiment, one elongated denting part 800 is formed along the back side frame 80 in the direction of its length (in other words, the longitudinal direction), but a plurality of such denting parts may be formed and arranged along the back side frame 80 in the longitudinal direction of the back side frame 80.

The back side frame 80 have a plurality of protruding parts 803 and 804 that are arranged on the back side frame 80 in positions spaced apart from each other in a direction perpendicular to the longitudinal direction with the denting part 800 located between the protruding parts 803 and 804.

In other words, the front protruding part 803, the denting part 800, and the rear protruding part 804 are arranged on the side-surface plate part 80a of the back side frame 80 in this sequence from the front to the rear.

The plurality of protruding parts 803 and 804 are formed as logical consequence to have the denting part 800 dented relative to the protruding parts 803 and 804, and in a side view, forms a surface Rs (hereinafter referred to as reference surface Rs) that is a region defined adjacent to the denting part 800 on the side-surface plate part 80a and not forming the denting part 800.

A fitting opening 806 for a member constituting the reclining mechanism 9 to be fitted therein is formed at the lower end portion of the back side frame 80.

A seat cushion frame 7 mainly includes a pair of left and right cushion side frames 70 and 71, a rear pipe frame 72 connecting rear end portions of the left and the right cushion side frames 70 and 71, a front pipe frame 73 (in other words, a front frame) connecting front end portions of the left and the right cushion side frames 70 and 71, and a pan frame 74 as a pressure-receiving member that receive a load from an occupant.

Each of the pair of cushion side frames 70 and 71 has a shape elongate in the front-rear direction, and the rear end portions are connected to the seatback frame 8 via the reclining mechanism 9.

Specific configuration of the pair of left and right cushion side frames 70 and 71 will be described below.

The rear pipe frame 72 and the front pipe frame 73 are made of piping. The rear pipe frame 72 connects the rear end portions of the pair of left and right cushion side frames 70 and 71 curving upward, and therefore the back pipe frame 72 is located at a position above the front pipe frame 73 in the upward-downward direction.

The pan frame 74 is a pressure-receiving member made of a metal plate that receives a load from an occupant seated on the vehicle seat, and is located under the thighs of the occupant seated in a normal driving position.

A pair of left and right slide rails 75 and 76 that allows the seat cushion frame 7 to slide thereon are provided under the seat cushion frame 7, so that an occupant can cause the seat cushion frame 7 to move to his/her desired position, relative to the floor of the vehicle seat.

A front end portion of each cushion side frame 70 roughly refers to a region where the front pipe frame 73 and the pan frame 74 is provided, and a rear end portion of the cushion side frame 70 roughly refers to a region where the rear pipe frame 72 and the reclining mechanism 9 is provided.

The part between the front end portion and the rear end portion may be referred to as a center portion of the cushion side frame 70, and is located between the rear pipe frame 72 and the front pipe frame 73.

The cushion side frame 70 includes a side surface plate part 70a, an upper surface plate part 70b formed integrally with an upper edge part of the side surface plate part 70a, and a lower surface plate part 70c formed integrally with a lower edge part of the side surface plate part 70a. The cushion side frame 70 has an approximately U-shaped cross-section.

A denting part 700 is formed at a portion of the side surface plate 70a, corresponding to the center portion of the cushion side frame 70.

In the present embodiment, one elongated denting part 700 is formed along the cushion side frame 70 in the direction of its length (in other words, the longitudinal direction or the front-rear direction), but a plurality of such denting parts may be formed and arranged along the cushion side frame 70 in the longitudinal direction of the cushion side frame 701.

The cushion side frame 70 further includes a plurality of protruding parts 703 and 704 arranged adjacent to upper and lower edges of the denting part 700, i.e., in directions perpendicular to a direction of the length of the cushion side frame 70.

In other words, an upper protruding part 703, the denting part 700, and a lower protruding part 704 are arranged on the side surface plate part 70*a* of the cushion side frame 70 in this sequence from the top to the bottom.

The denting part 700, located between the plurality of protruding parts 703 and 704, is formed in a shape that dents inward in the left-right direction (toward the center of the seat equidistant from the left and right edges of the seat) and includes a bottom plate part 701 that constitutes the bottom surface of the denting part 700 and a standing wall part 702 that constitutes the side surface of the denting part 700.

The reclining mechanism 9 connects the seat cushion frame 7 and the seatback frame 8, and allows the seatback frame 8 to be tilted with respect to the seat cushion frame 7.

Figure 13:
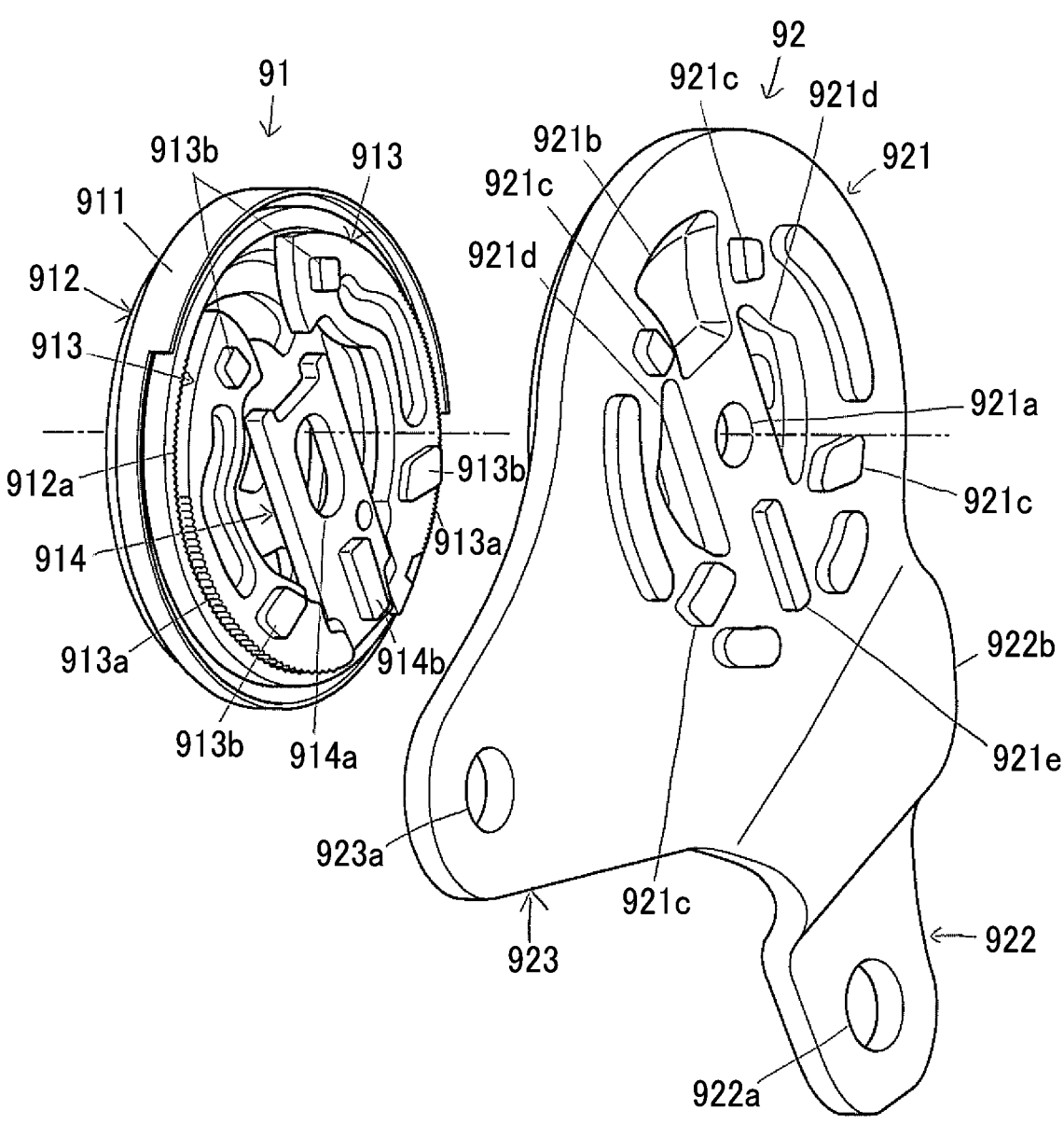
FIG. 13 is an exploded perspective view showing parts of a reclining mechanism of the vehicle seat according to the second embodiment.

As shown in FIG. 13, the reclining mechanism 9 includes a reclining adjuster 91 and a bracket 92.

The reclining mechanism 9 further includes a shaft 93 (refer to FIG. 10 and FIG. 11) and a biasing member 94 (refer to FIG. 10 and FIG. 11).

The reclining adjuster 91 forms another part of the reclining mechanism 9 and is provided at the side surface of a lower part of the seatback frame 8, as shown in FIG. 14.

As shown in FIG. 13, the reclining adjuster 91 includes a ring 911, a case 912, a pair of lock parts 913, a cam part 914, a first biasing member (not shown in the figures), and a second biasing member (not shown in the figures).

The ring 911 is a member in the shape of a circle.

The ring 911 has a rim of which a part is indented and thereby rendered engageable with the bracket 92.

The case 912 is formed in a shape of a circular tray.

The case 912 has formed at its center a hole for the shaft 93 to be inserted therethrough.

The case 912 is rotatably fitted in the ring 911.

The case 912 has an internal gear. In other words, a plurality of teeth 912*a* are formed on the inner surface of the side wall that forms the inner periphery of the case 912.

Figure 12:
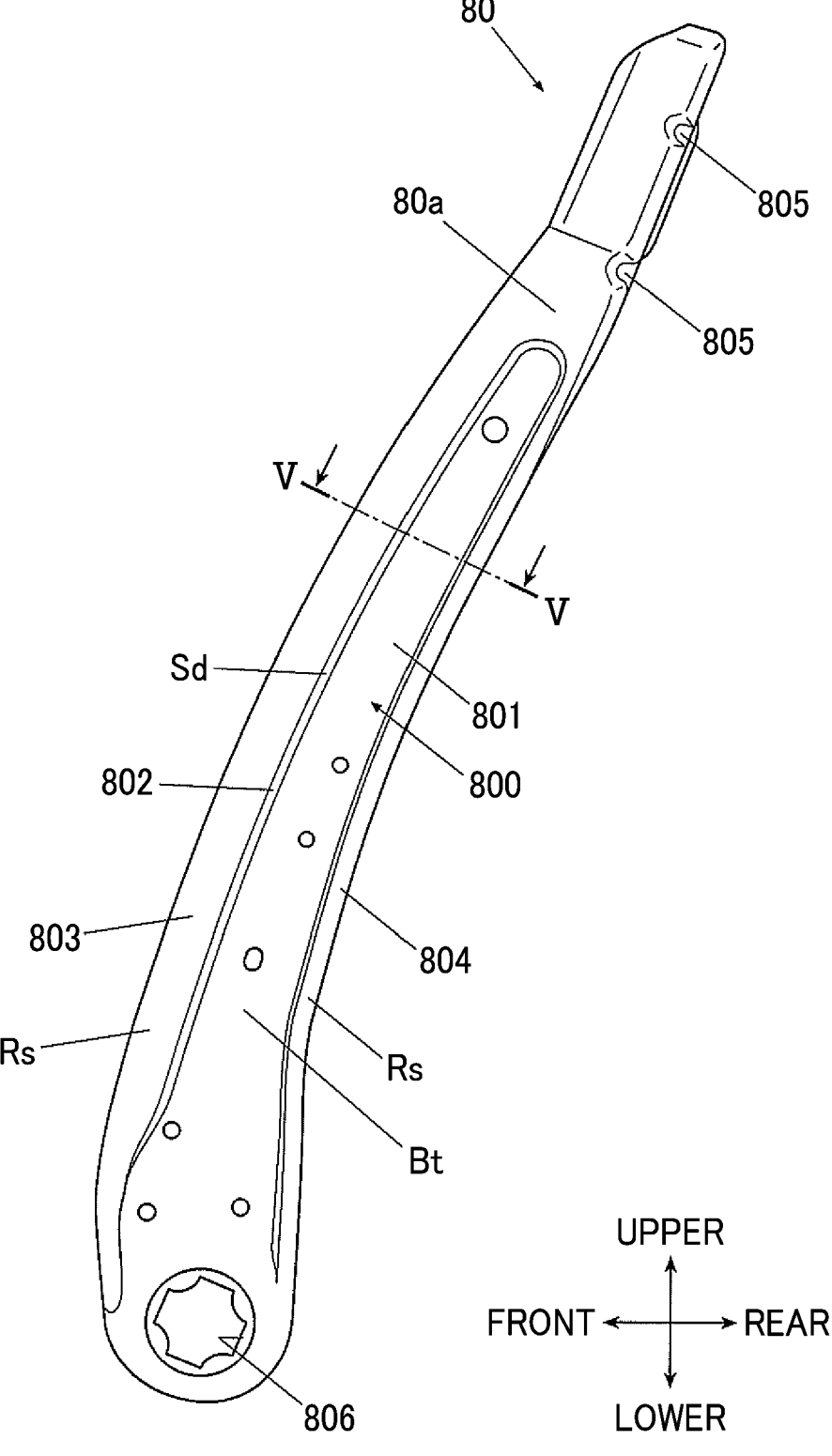
FIG. 12 is a side view of the back side frame of the vehicle seat according to the second embodiment as viewed from the outside.

The case 912 fits a fitting opening 806 (refer to FIG. 12) formed at a lower end portion of the back side frame 80.

The pair of lock parts 913 is a movable member of the present disclosure.

Each lock part 913 is formed in a shape of an arc, and is located along the inner surface of the side wall of the case 912.

Each lock part 913 includes teeth 913*a* and protrusions 913*b*.

The teeth 913*a* are formed on the surface of each lock part 913 facing the side wall of the case 912.

The protrusions 913*b* are formed to protrude toward the bracket 92.

The pair of lock parts 913 is slidable in directions toward and away from each other.

When the lock part 913 is in a position closest to the side wall of the case 912, the teeth 913*a* are engaged with the teeth 912*a* of the case 912.

The cam part 914 is located to extend from the center of the case 912 in one direction (downward in this embodiment).

The cam part 914 includes a long hole 914*a* and protrusion 914*b*.

The long hole 914*a* is formed at an end portion of the cam part 914 that is the end closer to the center of the reclining adjustor 91, and the shaft 93 is put through the long hole 914*a*.

The protrusion 914*b* is formed to protrude toward the bracket 92.

The cam part 914 is movable in directions parallel to the direction of length of the cam part 914 (the upward-downward direction in the present embodiment). When the cam part 914 moves downward, the end portion of the cam 914 closer to the side wall of the case 912 (the lower end portion in the present embodiment) moves in to a space between the pair of lock parts 913, and push the pair of lock parts 913 away from each other.

The first biasing member biases the pair of lock parts 913 toward each other.

The second biasing member biases the cam part 914 toward the side wall of the case 912 (downward in this embodiment).

The bracket 92 is formed by sheet metal working, and a pair of left and right brackets are provided.

Each bracket 92 has a shape of a plate extending parallel to a side surface of the seat cushion frame 7.

Each of the brackets 92, of which the left side bracket 92 is shown in FIG. 14, connects the corresponding left or right outer side surface of the seat cushion frame 7 and the left or right outer side surface of the seatback frame 8.

As shown in FIG. 13, each bracket 92 includes an integrating part 921, a hanging part 922, and an extending part 923.

The integrating part 921 includes an bearing hole 921*a*, a first protruding part 921*b*, first denting parts 921*c*, second protruding parts 921*d*, and a second denting part 921*e*.

The bearing hole 921*a* is a hole in which the shaft 93, inserted therethrough in the left-right direction is positioned.

The first protruding part 921*b* protrudes from the integrating part 921 toward the reclining adjuster 91 at a part, facing a space between the immovable end portions (not moved by the cam part 914) of the pair of lock parts 913, of the integrating part 921 (at the upper part of the integrating part 921 in the present embodiment).

The first protruding part 921*b* is located in the gap between the end portions of the pair of lock parts 913 of the reclining adjuster 91 and restricts the movement of these end portions of the pair of lock parts 913.

Each of the first denting parts 921*c* is dented in a direction away from the reclining adjuster 91 at a part, facing the corresponding protruding part 913*b* of the lock parts 913, of the integrating part 921.

Each first denting part 921*c* is fitted in the corresponding protruding part 913*b* of the lock parts 913 to guide the corresponding protruding part 913*b*.

The second protruding parts 921*d* protrude from the integrating part 921 toward the reclining adjuster each at a part, facing a gap between the corresponding lock part 913 and the cam 914 of the reclining adjuster 91, of the integrating part 921.

The second protruding parts 921*d* are each located in the gap between the corresponding lock part 913 and the cam part 914 of the reclining adjuster 91 and configured to guide the movement of the cam part 914.

The second denting part 921*e* is dented in the direction away from the reclining adjuster 91 at a part, facing the protruding part 914*b* of the cam part 914, of the integrating part 921.

The second denting part 921*e* is fitted on the protruding part 914*b* of the cam part 914 to guide the protruding part 914*b* (i.e. to guide the movement of the cam part 914).

The hanging part 922 is a part of the bracket 92 that hangs down from the integrating part 921.

The lower end portion of the hanging part 922 has a connecting part 922*a* connected to the seat cushion frame 7.

The connecting part 922*a* according to the present embodiment is configured as a bolt hole, and as shown in FIG. 14, the connecting part 922*a* is connected to the corresponding cushion side frame 70, 71 by a bolt BL1 inserted through this bolt hole and a bolt hole of the corresponding cushion side frame 70, 71.

The hanging part 922 includes a fragile part 922b.

The fragile part 922b is provided between the integrating part 921 and the connecting part 922a, i.e. at a middle part of the hanging part 922.

The fragile part 922b is a part that may plastically deformable when there is an impact. The fragile part 922b plastically deforms and absorbs the impact received by the seat cushion frame 7 (or the seatback frame 8), and makes it possible to reduce the impact transmitted to the seatback frame 8 (or the seat cushion frame 7). As shown in FIG. 13, the fragile part 922b according to the present embodiment is the middle part of the hanging part 922, which curves and protrudes in a direction perpendicular to the side surface of the seat cushion frame 7.

As shown in FIG. 14, the fragile part 922b according to the present embodiment curves such that the diameter of the fragile part 922b increases from the front toward the rear (d2<d3).

The extending part 923 is a part of the bracket 92, which extends frontward from the integrating part 921.

The front end part of the extending part 923 is a second connecting portion 923a that connects to the seat cushion frame 7.

The second connecting portion 923a according to the present embodiment is a bolt hole similar to the connecting part 922a, and is connected to the corresponding cushion side frame 70, 71 by a bolt BL1 inserted through this bolt hole and a bolt hole of the corresponding cushion side frame 70, 71.

As shown in FIG. 13, the bracket 92 configured according to the present embodiment has the integrating part 921 disposed to face the reclining adjuster 91.

The rim part of the integrating part 921 and the ring 911 of the reclining adjuster 91 are connected (in this case, the indented rim of the ring 911 engages with the bracket 92).

As a result, the integrating part 921 becomes a guide for the sliding of the lock parts 93 (movable member) and the cam part 914, etc., of the reclining adjuster 91.

Accordingly, the case 912 surrounded by the ring 911 and the back side frame 80, to which the case 912 is fitted becomes rotatable relative to the bracket 92.

As described above, in the reclining mechanism 9 according to the present embodiment, the bracket 92 is attached directly to the reclining adjuster 91, and the lock parts 913 and the cam part 914 are guided by the first protruding part 921b, the first denting parts 921c, the second protruding parts 921d, and the second denting part 921e. Therefore the integrating part 921 forms a lid that connects to or engages with the reclining adjuster 91, or a member formerly provided as a part of the reclining adjuster is formed integrally with the bracket 92 as an integrating part 921.

The shaft 93 is inserted through the hole of the case 912 of the reclining adjuster 91, the long hole 914a of the cam part 914, and the bearing hole 921a of the integrating part 921 of the bracket 92, and support the seatback frame 8 in a manner that permits the seat back frame 8 to rotate.

A lever (not shown in the figures) is attached to one end of the axle 93.

When the lever is moved frontward and downward (or upward and downward), the shaft 93 is rotated with respect to the movement of the lever.

The biasing member 94 biases the seatback frame 8.

The biasing member 94 according to the present embodiment is a coil spring wound one or more turns around the shaft 93.

As shown in FIG. 10 and FIG. 11, one end of the biasing member 94 is engaged with the seatback frame, and another end is engaged with the bracket 92 directly or indirectly.

Therefore, the biasing member 94 biases the seatback frame 8 towards the front (to cause the seatback frame 8 to rotate in the counter-clockwise direction in FIG. 11 and FIG. 13).

In the reclining mechanism 9 configured as described above according to the present embodiment, when the lever (not shown in the figures) is pulled, the cam part 914 moves in a direction away from the side wall of the case 912 (upward in the present embodiment) synchronously with the movement of the lever, and the pair of lock parts 913 slide toward each other. Thereupon, the engagement of the teeth 913a of the lock parts 913 and the teeth 912a of the case 912 are disengaged, and the reclining mechanism 9 comes in a state that is not locked. The angle of the seatback frame 8 can be adjusted to a chosen angle during this state.

When the lever is released, the cam part 914 moves toward the side wall of the case 912 (downward in the present embodiment), and the pair of lock parts 913 slide away from each other. Thereupon, the teeth 13a of the lock parts 913 and the teeth 912a of the case 912 are engaged, and the reclining mechanism 9 becomes locked.

In the vehicle seat according to the present embodiment, since the bracket 92 includes a fragile part 922a that can plastically deform when there is an impact, and the reclining adjuster 91 is formed integrally with the bracket 92, the lid formerly provided as a member (other than the bracket) engageable with the bracket is configured as an integrate part of the bracket (the integrating part 921), and therefore becomes less likely to come off from the reclining adjuster 91 when the fragile part 922b plastically deforms when there is a collision, etc. Therefore, the reclining mechanism 9 is less likely to receive a negative effect when the fragile part included in the bracket 92 plastically deforms.

Next, an embodiment of a frame structure of a side frame will be described in detail with references made to the drawings where appropriate.

A seat frame 100 includes, as shown in FIG. 15 for example, a seatback frame 110, a pair of cushion side frames 120 disposed to the left and to the right of a lower part of the seatback frame 110, and a seat bottom frame 130 that supports a cushion pad (not shown in the figures) disposed between the pair of cushion side frames 130, etc.

The seatback frame 110 includes a pair of left and right back side frames 111, and a pipe-shaped upper frame 112 provided above the pair of back side frames 111. The upper frame 112 connects the pair of back side frames.

A support shaft 150 that connects the seatback frame 110 to the pair of left and right cushion side frames 120 is provided at the lower end portion of the seatback frame 110.

The support shaft 150 is oriented in a left-right direction (here, the direction of the width of the seat) and attached to the seatback frame 110 in such a manner that the seatback frame 110 is pivotally supported by the support shaft 150 and thus the upper end portion of the seatback frame 110 can be tilted frontward and rearward.

The pair of left and right cushion side frames 120 are provided with a connecting frame 140 that connects the pair of left and right cushion side frames. The connecting frame 140 is oriented in the left-right direction (the direction of the width of the seat) and attached to the pair of left and right cushion side frames 120.

The connecting frame 140 is a pipe member, and both ends of the connecting pipe of the connecting frame 140 are inserted into the insertion holes H provided in the pair of left and right cushion side frames 120.

The seat bottom frame 130 is disposed at front end portions of the pair of left and right cushion side frames 120.

The seat bottom frame 130 is supported on the pair of left and right cushion side frames 120 pivotally by a supporting shaft 160 extending in the left-right direction to thereby raise and lower the front end portion of the seat bottom frame 130.

Next, the frame structure of the side frame of the present embodiment will be described below.

The cushion side frame 120 shown in FIG. 16A is a side frame provided at the right side of the seat frame 100.

The cushion side frame 120 at the left side of the seat frame 100 is approximately symmetrical to the cushion side frame 120 at the right side of the seat frame 100 with respect to a line that extends through the center of the cushion in a direction perpendicular to the direction of the width of the seat (left-right direction).

The cushion side frame 120 includes a frame body part 123, and a flange part 124 having a shape formed by bending an edge of the frame body part 123, for example, as shown in FIG. 16A and FIG. 16B.

The frame body part 123 includes a base part 121 connecting to the flange part 124 and a center part 122 located apart from the flange part 124 and having a protruding shape.

The center part 122 of the frame body part 123 protrudes in a direction in which the flange part 124 protrudes. In other words, the center part 122 includes a part connecting to the base part 121 and extending from the base part 121 in the same direction in which the flange part 124 protrudes from the base part 121, and a part approximately parallel to the base part 121 and located in a position shifted from the base part 121 one step in the direction in which the flange part 124 protrudes.

The center part 122 of the cushion side frame 120 is formed to have a shape that is more complex compared to those of the base part 121 and the flange part 124, as shown in FIG. 16A.

Specifically, the insertion hole H for the connecting frame 14 to be inserted therein is formed in the center part 122 of the cushion side frame 120.

The part in which the insertion hole H is formed is surrounded by the base part 121 extending in an approximately U-shaped profile.

In other words, at least a part of the area around the insertion hole H for the connecting frame 140 to be inserted therein and attached to the cushion frame 120 is surrounded by the base part 121.

As shown in FIG. 17, the flange part 124 and the base part 121 of the cushion side frame 120 are provided with a plurality of bulges formed by an embossing process.

Therefore, by providing a plurality of bulges on the flange part 124 and base part 122 of the cushion side frame 120 by the embossing process, the rigidity of the parts can be increased without increasing the thickness.

As shown in FIG. 18, a side frame may include a frame body part 123 and a flange part 124 having a shape formed by bending an edge of the frame body part 123. The side frame here is, for example, a back side frame 111.

For example, the frame body part 123 of the back side frame 111 may not include a base part 121 or a center part 122, and a flange part 124 is formed by bending an outer edge of the frame body 123 made of a stainless steel plate.

The frame body part 123 of the back side frame 111 is formed to have a shape that is more complex compared to that of the flange part 124.

As shown in FIG. 18, the flange part 124 of the back side frame 111 is provided with a plurality of bulges by an embossing process.

Next, an embodiment of a vehicle latch device will be described in detail with reference made to the attached drawings where appropriate. As shown in FIG. 19, the vehicle latch device L of the embodiment is, for example, provided on a side frame SF1 for a backrest among a seat frame SF of a vehicle seat for vehicles such as cars. As an example, a bracket SF2 formed of sheet metal is welded to the side frame SF1, and the vehicle latch device L is fixed by bolts BL2 to a weld nut WN fixed to the bracket SF2.

The vehicle latch device L includes a case C, and various parts such as a latch LT stored in the case C. An access groove C1 that opens to the right in FIG. 19 is formed in the case C, and the latch LT is caused to change its state between a closed state and an open state by a hook-shaped part 33H (refer to FIG. 21) advancing into or retreating from the approaching groove C1. The vehicle latch device L is also configured to be capable of locking the latch LT from an unlock state in which the latch LT is open, by being pressed against and engaged with a bar-shaped part P3 of a striker P fixed to the vehicle body VB (refer to FIG. 22). The vehicle latch device L is also configured to be capable of unlocking the latch LT by pulling on a rod RD to operate the latch LT from the closed state to the open state, as will be described later. In other words, the latch LT is configured to be able to take a lock state in which the latch LT engages with the bar-shaped part P3, and an unlock state in which the latch LT disengages from the bar-shaped part P3.

As shown in FIG. 20, the vehicle latch device L mainly includes the case C, the latch LT, a ratchet RC, a lever member LM, a rod RD, and a load-receiving member LB. In describing vehicle latch device L below, the upper/lower, left/right, and front/rear direction indicated by the arrows in FIG. 20 will be used for the up/down (upper/lower; upward/downward; vertical), left/right (leftward/rightward; lateral), and front/rear (frontward/rearward) direction as a matter of convenience, but it is needless to say that the vehicle latch device L may be used in any positions.

The case C includes a plastic case CS made of plastic, and a reinforcing plate R made of a steel sheet (metal). The weight of the vehicle latch device L is significantly reduced by adopting the plastic case CS, while the rigidity and the strength of the vehicle latch device L is ensured by being partially provided with the reinforcing plate R.

The plastic case CS is integrally formed by connecting a tray-shaped lower case CS1 and upper case CS2, each having an opening to one side, by a hinge HN which is thinner than the upper and lower cases CS1, CS2. Such a plastic case CS can be formed by integral molding using a set of molds. The upper case CS2 can be swung on the hinge relative to the lower case CS1, and when the open sides of the upper case CS2 and the lower case CS1 are put together, the plastic case CS assumes a shape of a box.

The lower case CS1 is formed to have a shape of a tray, and includes a flat plate-shaped base part 16A and a side wall part 17A raised from a part of an edge of the base part 16A. An access groove 15A that corresponds to the access groove C1 is formed at a lower edge of the base part 16A. A cylindrical first shaft 18 and second shaft 19 are provided respectively on the left and right sides of 15A in positions shifted upward to some extent from 15A, and extend inward from the base part 16A. Both of the first shaft 18 and the second shaft 19 are formed integrally with the base part 16.

A bolt hole 18H that is a through hole having an circular cross section pierces through the first shaft 18 along the axis of the first shaft 18. A bolt hole 19H that is a through hole having an circular cross section also pierces through the second shaft 19 along the axis of the second shaft 19. The bolt holes 18H and 19H both have inside diameters that are approximately the same as the outside diameter of a shank 96 of the bolt BL2.

With the exception of not having the first shaft 18 and the second shaft 19, the upper case CS2 has an interior structure approximately symmetrical to that of the lower case CS1 with respect to the hinge HN. The upper case CS2 is formed to have a shape of a tray, and includes a flat plate-shaped base part 16B and a side wall part 17B raised from a part of an outer edge of the base part 16B. An access groove 15B corresponding to the access groove C1 is formed at an upper edge (lower edge after assembled) of the base part 16B. Bolt holes 13P and 13Q corresponding to the bolt holes 18H and 19H are provided respectively on the left and right sides of the access groove 15B in positions shifted downward (positions shifted upward after assembled) to some extent from the access groove 15B.

The reinforcing plate R is formed to cover all of the outer sides of the lower case CS1 except for a part of the upper part, and includes a flat plate-shaped base part 21B and side walls 27 raised inward from the left and right edges of the outer periphery of the base part 21B. Though not shown in the figures in detail, the side wall 27 of the restricting plate R is configured to be engageable with the side wall 17a of the lower case CS1, for temporary assembly with the lower case CS1.

Positioning protrusions protruding from the rear side of the lower case CS1 in positions corresponding to the first shaft 18 and the second shaft (only the protrusion 18J that correspond to the first shaft 18 is shown in FIG. 23) are provided on the lower case CS1, and positioning holes 22H and 23H to be fitted on the corresponding positioning protrusions are formed in the base part 21B. An access groove 25 corresponding to the access groove C1 is formed at a lower edge of the base part 21B.

A flange 28 raised outward is formed at the upper edge of the outer side of the reinforcing plate R. The flange 28 is a part that contacts and supports the load-receiving member LB to withstand a force received by the load-receiving member LB from the bar-shaped part P3 of the striker P (refer to FIG. 22).

The latch LT is a part that locks and unlocks the vehicle latch device L by engaging with and disengaging from the bar-shaped part P3 of the striker P3. The latch LT is formed by stamping a thick metal plate, and include a first hole part 31H that is a through hole of the latch LT pierced in the thickness direction. The latch LT is supported with the first hole 31H fitted to the periphery of the first shaft 18, rotatable relative to the plastic case CS. Specifically, the latch LT includes a latch body part LT1 made of metal and a cover LT2 made of plastic, more flexible than the latch body LT1. The latch body part LT1 covers the front surface and parts of the side edges of the latch body LT1. The cover LT2 is provided to increase the sliding properties between the ratchet RC and the latch LT. The cover LT2 is combined with the latch body LT1 along a direction parallel to the axis of the first hole part 31H.

As shown in FIG. 21, the latch LT includes a groove 32G for receiving the bar-shaped part P3, and a part that defines the contour of the groove 32G is configured as a hook-shaped part 33H that is engagable with the bar-shaped part P3 when the latch LT is in the lock state. The latch LT further includes a protruding part 39 located opposite to the hook-shaped part 33H and protruding from the vicinity of the first hole 31H. The latch LT further includes a dent lock part 34C formed at an upper right edge of the latch LT in the position shown in FIG. 22. The dent lock part 34C is dented toward the first hole 31H of the latch LT in the position shown in FIG. 22. The rim part adjacent to the left side of the dent lock part 34C is an open contact surface 35 with which ratchet RC comes in contact to keep the open state of the latch LT when the latch LT is disengaged. The open contact surface 35 have a convex surface facing outside, and in the entire range of the open contact surface 35 contacting the end portion 42A of the ratchet RC described later, the direction from the outer surface of the open contact surface 35 toward the center of a circle of curvature (refer to the arrow AW in FIG. 22) is shifted from the rotation axis of the latch LT to one side, to the right here. Therefore, the force received from the end portion 42A by the latch LT acts to rotate the latch LT in the clockwise direction, in other words, to the open state.

A pin 36 protruding frontward is press fitted to the latch LT so that the lever member LM is pivotally supported.

The hook-shaped part 33H, in the lock state of the latch LT engaged with the bar-shaped part P3 as shown in FIG. 22, includes a first support surface 38A that faces the bar-shaped part P3 from below in a position closest to the bar-shaped part P3 when there is no external force imposed, a protruding part 37 protruding from the first support surface 38A in a position closer to the end portion of the hook-shaped part 33H than the first support surface 38A, and a second support surface 38B provided on the protruding part 37 in such a position that the second support surface 38B faces the bar-shaped part P3. The first support surface 38A and the second support surface 38B face in different directions, and are disposed adjacent to each other so that the first support surface 38A and the second support surface 38B can contact the bar-shaped part P3 at the same time. The second support surface 38B engages with the bar-shaped part P3 when the latch LT in the lock state is caused to rotate toward the unlock state by an external force. In the present embodiment, the bar-shaped part P3 has a cylindrical shape. To allow the bar-shaped part P3 to contact the first support surface 38A and the second support surface 38B at the same time, each of the first support surface 38A and the second support surface 38B is configured to be a flat surface, a convex surface, or a concave surface having a radius of curvature longer than the radius of the bar-shaped part P3. For example, the both of the first support surface 38A and the second support surface 38B in this embodiment are flat surfaces. The first support surface 38A and the second support surface 38B facing in different directions and having enough length can contact the bar-shaped part P3 at the same time when the bar-shaped part P3 comes in a corner formed by the first support surface 38A and the second support surface 38B.

As shown in FIG. 20 and FIG. 22, the ratchet RC is an approximately plate-shaped metal member having a second hole part 41H pierced in the thickness direction, and the second shaft 19 of the plastic case CS is fitted therein, so that the ratchet RC is pivotally supported by the plastic case CS. The rotation axis of the ratchet RC is parallel to the rotation axis of the latch LT. The ratchet RC includes an approximately fan shaped body part 42B spreading out upward and leftward with distance from the second hole part 41H. The body part 42B includes an end portion 42A pointing toward the latch LT. The end portion 42A is positioned in the dent lock part 34C of the latch LT when the latch LT is in the closed state. When the latch LT is in the open state, the end portion 42A contacts the open contact surface 35 and serves to maintain the open state.

The actuate surface of the fan-shaped body part 42B is an unlock restricting surface 42S. The unlock restricting surface 42S restricts the latch LT in the lock state from rotating toward a position in the unlock state (rotating clockwise in FIG. 22). The unlock restricting surface 42S is a convex surface. To be more specific, the unlock restricting surface 42S has a shape of a segment of a circle the center of which coincides with a rotation axis of the ratchet RC.

A thin arm 43A is formed at the upper part of the body part 42B and extends therefrom upward, and a hook 44 is formed at an upper end of the arm 43A. The right end of a tension spring SP, as an example of a biasing member, is attached to the hook 44. The end portion of the tension spring SP is engaged with the hook 44 that is a hook-shaped part of the end of the arm 43A. As shown in FIG. 20, a hole 48 is formed in the arm 43A, and a rod RD for switching the vehicle latch device L from the lock state to the unlock state is pivotally connected to the hole 48 by a rivet RB.

As shown in FIG. 22, a pin 45 is provided in a position. slightly to the right of an end portion 42A, of the body part 42B. The pin 45 is press-fitted in the body part 42B, and protrudes frontward therefrom. As shown in FIG. 20, the ratchet RC further includes a flange 47 provided around the second hole 41H and protruding frontward in the direction of the rotation axis. The flange 47 protrudes to a length corresponding to the thickness of the lever member LM, and when the latch LT is in a closed state, the lever member LM is brought into contact with the flange 47 by the biasing force of the tension spring SP so that a play of the lever member LM is eliminated.

The lever member LM is an operating mechanism that links the movement of the latch LT with the movement of the ratchet RC. The lever member LM is a narrow plate-shaped member, and the lever member LM is rotatably supported by a hole 51H formed at approximately a center of the lever member LM in the lengthwise direction as fitted to the pin 36 of the latch LT.

The lever member LM includes an actuating arm 52A and an operating arm 53. When the lever member LM is in the position of FIG. 22, the actuating arm 52A extends in an obliquely-downward-and-rightward direction from the rotation axis, and the operating arm 53 extends upward. A guide hole 52H having a shape of a deformed quadrangle is formed in the actuating arm 52A. The pin 45 of the ratchet RC is located inside the guide hole 52H. An end of the actuating arm 52A has a stopper surface 52B that contacts the flange 47 of the ratchet RC to remove the play of the lever member LM. A hook 54 is formed at an end of the operating arm 53, and a left end of the tension spring SP is engaged with the hook 54.

The ends of the tension spring SP are hooked respectively to the ratchet RC and the lever member LM as shown above, and create a continuous biasing force that pulls the body part 42B of the ratchet RC and the operating arm 53 of the lever member LM toward each other. This biasing force also functions to create a force that biases the end portion 42A of the ratchet RC toward the latch LT.

The load-receiving member LB is a plastic member that contacts the bar-shaped part P3 of the striker P and receives a load from the striker P. Though not specifically described, the load-receiving surface 89A at the lower end of the load-receiving member LB contacts the bar-shaped part P3, and a load received from the bar-shaped part P3 by the load-receiving member LB is transmitted to the flange 28 of the reinforcing plate R, so that the reinforcing plate R receives the load.

As shown in FIG. 23, the lower case CS1 and the upper case CS2 are fastened to each other in a box shape, combined with the reinforcing plate R, and fixed to the bracket SF2 by the bolt BL2. The bolt BL2 includes a shank part 96, a thread part 97 provided at an end of the shank part 96, and a flanged head 98 provided at a base end of the shank 96.

The lower case CS1 and the upper case CS2 assembled with the latch LT and other parts installed therein and their open ends opposed to each other, into a shape of a box which in turn is fixed to the bracket SF2 by inserting the shank part 96 of the bolt BL2 through the bolt holes 18H and screwing the thread part 97 into a welding nut WN of the bracket SF2. A spring washer 95 is placed between the flanged head 98 and the reinforcing plate R, and the elasticity of the spring washer 95 is used to hold the vehicle latch device L between the bracket SF2 and the flanged head 98. It should be noted that, here, fastening in the first shaft 18 by the bolt BL2 is described with reference to FIG. 23, but the fastening in the second shaft 19 by the bolt BL2 is exactly the same. Therefore, description of the fastening in the second shaft 19 is omitted.

Referring back to FIG. 21, the latch LT includes a contact surface 34A provided on the dent lock part 34C extending away from the first hole 31H. In FIG. 21, the contact surface 34A is located at a position closes to the open contact surface 35 on the dent lock part 34C, and connects the bottom of the dent lock part 34C and the open contact surface 35. The contact surface 34A is the surface that contacts the unlock restricting surface 42S when the latch LT in the lock state is caused to rotate toward the unlock state by an external force. To achieve surface contact with the unlock restricting surface 42S, the contact surface 34A has a shape contoured to fit to the unlock restricting surface 42S. To this end, when the latch LT is formed in the process of manufacturing the vehicle latch device L, the contact surface 34A is formed into a shape contoured to fit the unlock restricting surface 42S so that the contact surface 34A makes surface contact with the unlock restricting surface 42S. As described above, the unlock restricting surface 42S is an arc-shaped convex surface, and therefore the contact surface 34A is an arc-shaped concave surface contoured to fit the arc-shaped convex surface of the unlock restricting surface 42S.

It is preferable that a contact length LG1, i.e., the length of contact of the unlock restricting surface 42S with the contact surface 34A as measured when viewed in a direction aligned with the rotation axis of the latch LT be as long as possible. The contact length LG1 is longer than the diameter of the pin 36 in the present embodiment. The contact length LG1 is longer than the thickness of the ratchet RC. The contact length LG1 is also longer than the length LG2 of a contact area of the bar-shaped part P3 with the latch LT when the latch in the lock state is caused to rotate toward the unlock state by an external force and contacts the first support surface 38A and the second support surface 38b (refer to FIG. 29). If the bar-shaped part P3 contacts the latch LT at two points as in the present embodiment, the length of the contact area is the length LG2 along the bar-shaped part P3 from a point A of contact of the bar-shaped part P3 with the first support surface 38A to a point B of contact of the bar-shaped part P3 with the second support surface 38B.

Operation of the vehicle latch device L configured as above will be described.

In the lock state before the operation in FIG. 22, the bar-shaped part P3 of the striker P is in the deepest part of the access groove C1 of the case C, and the hook-shaped part 33H of the latch LT holds the bar-shaped part P3 from below. The end portion 42A is located in the dent lock part 34C of the latch LT and restricts the rotation of the latch LT. The tension spring SP creates a tensile force and the end portion 42A of the ratchet RC is in contact with the bottom of the dent lock part 34C. The bar-shaped part P3 of the striker P is in contact with the load-receiving surface 89A of the load-receiving member LB, and the load applied to the vehicle latch device L from the striker P is transmitted through the load receiving member LB to the flange 28 (refer to FIG. 20) of the reinforcing plate R, and is received by the reinforcing plate R.

When the rod RD is pulled from the state in which the latch LT is in the lock state as shown in FIG. 22, in the vehicle latch device L, as shown in FIG. 24, first the ratchet RC rotates in the clockwise direction, and the pin 45 of the ratchet RC pushes the right-upper edge of the guide hole 52H and rotates the lever member LM in the counter-clockwise direction while stretching the tension spring SP. There is little change in the position of the latch LT in FIG. 24 from FIG. 22, but the force applied to the lever member LM is gradually trying to rotate the latch LT in the clockwise direction via the pin 36.

When the rod RD is pulled further, as shown in FIG. 25, the ratchet RC further rotates in the clockwise direction and the end portion 42A completely disengages from the dent lock part 34C. The latch LT rotates clockwise by the force received from the lever member LM via the pin 36, and the end portion 42A faces the open contact surface 35 of the latch LT.

When the rod RD is returned by the tensile force of the tension spring SP from the state shown in FIG. 25, the end portion 42A of the ratchet RC contacts the open contact surface 35 of the latch LT, as shown in FIG. 26. The force of the ratchet RC pushing the latch LT, as shown by the bold arrow in FIG. 26, is transmitted from the contact point of the end portion 42A and the open contact surface 35 toward the center of curvature of the open contact surface 35. The center of curvature of the open contact surface 35 is shifted to the right of the rotational axis of the latch LT in the range the contact surface 35 contacts the end portion 42A, and therefore the pushing force of the ratchet RC generated by the biasing of the tension spring SP and acting against the latch LT functions as a force (torque) that causes the latch LT to rotate in the clockwise direction, that is, toward the open state.

When the latch Lt is caused to rotate in the clockwise direction by the torque with the open contact surface 35 sliding along the end portion 42A, as shown in FIG. 27, the latch LT is brought into an open state, and the bar-shaped part P3 of the striker P is disengaged from the access groove C1. In other words, the vehicle latch device L become comes in the unlock state.

To return the vehicle latch device L from the unlock state to the lock state, from the state in FIG. 27, the bar-shaped part P3 of the striker P is caused to enter the access groove C1 and pressed against the groove 32G of the latch LT to cause the latch LT to rotate in the counter-clockwise direction. Thereupon, the end portion 42A in contact with the open contact surface 35 slides over the open contact surface 35, and when the latch LT rotates sufficiently, the end portion 42A is caused to enter the dent lock part 34C by the biasing force of the tension spring SP. In other words, the vehicle latch device L returns to the lock state in FIG. 22.

Incidentally, when the vehicle latch device L is in the lock state as shown in FIG. 22, if the side frame SF1 of the backrest of the vehicle seat (refer to FIG. 19) is suddenly attempted to be tilted frontward without operating the rod RD, the vehicle latch device LT itself moves upward away from the striker P. Thereupon, the bar-shaped part P3 strongly pushes the first support surface 38A of the hook-shaped part 33H of the latch LT, and causes the latch LT to rotate in the clockwise direction, as shown in FIG. 28. The bar-shaped part P3 then slides over the first support surface 38A toward the end of hook-shaped part 33H (in other words, to an exit side of the groove 32G), and contact the protrusion 37.

At this point in time, as shown in the enlarged view of FIG. 29, the bar-shaped part P3 contacts the first support surface 38A at point A, and contacts the second support surface 38B at point B. In other words, the bar-shaped part P3 is pressed against the hook-shaped part 33H as shown by the arrow in FIG. 29, and this pressing force is supported by the two surfaces by contacting the first support surface 38A and the second support surface 38B at the same time. Therefore, in the vehicle latch device L of the present embodiment, the latch LT can firmly hold the bar-shaped part P3 even when external force attempting to take the vehicle latch device L off the striker P is applied.

At this point in time, as shown in FIG. 28 (also refer to the enlarged FIG. 21), the contact surface 34A of the latch LT contacts the unlock restricting surface 42S of the ratchet RC and thus restricts the latch LT from rotating in the clockwise direction as in FIG. 28. Since the contact surface 34A has a shape contoured to fit the unlock restricting surface 42S, the contact pressure of the contact surface 34A and the unlock restricting surface 42S can be reduced.

Since the convex surface of the unlock restricting surface 42S fits the contacting concave surface of the contact surface 34A when the unlock restricting surface 42S contacts the contact surface 34A, the contact of the contact surface 34A and the unlock restricting surface 42S is stable, and the lock state may be firmly maintained.

Since the unlock restricting surface 42S is shaped to fit an arc of which a center of curvature coincides with the rotation axis of the ratchet RC, even if the contact surface 34A hits the unlock restricting surface 42S hard, the contact force does not function as a rotational force, and the lock state can be maintained.

Since the contact length LG1 of the contact surface 34A and the unlock restricting surface 42S is longer than the diameter of the pin 36, the thickness of the ratchet RC, and the length LG2 of the length along the bar-shaped part P3 from point A to point B, the contact pressure of the contact surface 34A and the unlock restricting surface 42S can be reduced.

One embodiment of the vehicle latch device is described above, but the present disclosure may be modified where appropriate when implemented.

In the above-described embodiment, the unlock restricting surface 42S is a convex surface and the contact surface 34A is a concave surface, but the unlock restricting surface may be a concave surface and the contact surface may be a convex surface contoured to fit the unlock restricting surface. Both the unlock restricting surface and the contact surface may also be a flat surface.

The vehicle latch device may be provided at the seat bottom or legs instead of being used in the backrest of a vehicle seat for a car, and may be used as a device for locking a part of a car that is opened and closed such as a trunk. The vehicle seat may also be for vehicles other than cars such as for ships or air planes.

The elements described in the above-described embodiments and modified examples may be implemented in combined manners as desired.

What is claimed is:

1. A vehicle seat comprising:
side frames including cushion side frames disposed to a left and to a right of a seat cushion and back side frames disposed to a left and to a right of a seatback; and
plate-shaped brackets fixed to rear end portions of the cushion side frames to support the back side frames;
a connecting pipe connecting the left and right cushion side frames; and
a link pivotally connected to the left and right cushion side frames,
wherein each of the plate-shaped brackets includes:
a first plate-shaped part fixed to a corresponding back side frame; and
a second plate-shaped part fixed to a corresponding cushion side frame,
wherein the first plate-shaped part is disposed outwardly in the left-right direction relative to a corresponding back side frame,
wherein the second plate-shaped part is disposed inwardly in the left-right direction relative to a corresponding cushion side frame,
wherein the connecting pipe includes:
a first part that extends in the left-right direction,
a second part disposed above the first part and fixed to the cushion side frames, and
a third part that bends upward from the first part and connects to the second part, and
wherein the second part is disposed over the link.

2. The vehicle seat according to claim 1, further comprising a reclining mechanism that allow the back side frames to be tilted with respect to the cushion side frames,
wherein the first plate-shaped part is fixed to one of a back side frames via the reclining mechanism.

3. The vehicle seat according to claim 1, wherein the first plate-shaped part is disposed outwardly in the left-right direction relative to the corresponding second plate-shaped part.

4. The vehicle seat according to claim 3, wherein the plate-shaped bracket includes a fragile part connecting to the first plate-shaped part and the second plate-shaped part.

5. The vehicle seat according to claim 4, wherein the fragile part does not protrude outward in the left-right direction from an outer surface of the first plate-shaped part in the left-right direction.

6. The vehicle seat according to claim 4, wherein the fragile part extends from a front end of the plate-shaped bracket to a rear end of the plate-shaped bracket.

7. The vehicle seat according to claim 4, wherein the second plate-shaped part includes a first fixing part and a second fixing part to be fixed to the corresponding cushion side frame, and the fragile part extends from the first fixing part to the second fixing part.

8. The vehicle seat according to claim 4, wherein the fragile part extends from a top end of the cushion side frame to a rear end of the cushion side frame.

9. The vehicle seat according to claim 1, wherein the link has a straight shape.

10. The vehicle seat according to claim 1, wherein the second part extends in the left-right direction.

11. The vehicle seat according to claim 1, wherein the link has a rotation axis about which the link is rotatable relative to the cushion side frames and the rotation axis is disposed within an area of which an extent in an upward-downward direction is coextensive with that of a joining portion of the connecting pipe joining to a corresponding cushion side frame.

12. The vehicle seat according to claim 1, wherein each of the left and right cushion side frames comprise:
a pipe joint part to which the connecting pipe is joined; and
a link connecting part to which the link is connected,
wherein each of the left and right cushion side frames has a first dimension, in the upward-downward direction, corresponding to a portion in which the pipe joint part is provided, and a second dimension, in the upward-downward direction, corresponding to a portion in which the link connecting part is provided, the first dimension being smaller than the second dimension.

13. The vehicle seat according to claim 1, wherein at least a part of the first part does not overlap a corresponding cushion side frame when seen from a left or right side.

14. The vehicle seat according to claim 1 comprising:
a reclining mechanism that allows the seatback frame to be tilted with respect to the seat cushion frame,
wherein the plate-shaped bracket includes a fragile part that is capable of deforming when there is an impact on the plate-shaped bracket, and
wherein a part of the reclining mechanism is formed integrally with the plate-shaped bracket.

15. The vehicle seat according to claim 1, wherein the side frames comprises:
a base wall having a shape of an elongated plate, the base wall having a wall surface with two longer side edges located apart from each other in a direction of a width of the wall surface; and
a first flange part extending from one of the longer side edges in a direction nonparallel to the base wall,
wherein the first flange part comprises a first processed part that is reinforced by a quenching process or an embossing process.

16. The vehicle seat according to claim 1, wherein each side frame comprises:
a frame body part; and
a flange part formed by bending the side frame at an edge of the frame body part,
wherein at least the flange part has been subjected to an embossing process and is thereby provided with a plurality of bulges.

17. A vehicle latch device for the vehicle seat according to claim 1, that locks or unlocks by engaging with or disengaging from a bar-shaped part, comprising:
a case;
a latch pivotally supported by the case and rotatable between a lock state in which the latch engages with the bar-shaped part and an unlock state in which the latch disengages from the bar-shaped part; and
a ratchet pivotally supported by the case, the ratchet having an unlock restricting surface that restricts the latch from rotating toward the unlock state when the latch is in the lock state,
wherein the latch has a contact surface that contacts the unlock restricting surface when the latch in the lock state is caused to rotate toward the unlock state by an external force, and the contact surface being shaped to fit the unlock restricting surface and allowed to have surface contact with the unlock restricting surface.

18. The vehicle latch device according to claim 17, wherein the unlock restricting surface has a convex surface and the contact surface has a concave surface contoured to fit the convex surface.

19. The vehicle latch device according to claim 18, wherein the unlock restricting surface is shaped to fit an arc of which a center of curvature coincides with the rotational axis of the ratchet.

\* \* \* \* \*